(12) United States Patent
Kusama et al.

(10) Patent No.: US 9,287,588 B2
(45) Date of Patent: Mar. 15, 2016

(54) METHOD FOR MANUFACTURING BATTERY

(75) Inventors: Kazuyuki Kusama, Nagoya (JP);
Tomohiro Matsuura, Toyota (JP);
Ichiro Murata, Settsu (JP)

(73) Assignee: Toyota Jidosha Kabushiki Kaisha,
Toyota-shi, Aichi (JP)

( * ) Notice: Subject to any disclaimer, the term of this patent is extended or adjusted under 35 U.S.C. 154(b) by 705 days.

(21) Appl. No.: 13/384,407

(22) PCT Filed: Jan. 13, 2010

(86) PCT No.: PCT/JP2010/050289
§ 371 (c)(1),
(2), (4) Date: Jan. 17, 2012

(87) PCT Pub. No.: WO2011/086673
PCT Pub. Date: Jul. 21, 2011

(65) Prior Publication Data
US 2012/0279053 A1    Nov. 8, 2012

(51) Int. Cl.
*H01M 10/0587* (2010.01)
*H01M 2/26* (2006.01)
*H01M 2/30* (2006.01)

(52) U.S. Cl.
CPC .......... *H01M 10/0587* (2013.01); *H01M 2/266* (2013.01); *H01M 2/30* (2013.01); *Y10T 29/49108* (2015.01)

(58) Field of Classification Search
CPC combination set(s) only.
See application file for complete search history.

(56) References Cited

U.S. PATENT DOCUMENTS 2,100,921 A * 11/1937 Rolph ..................... H01M 2/06
429/175

(Continued)

FOREIGN PATENT DOCUMENTS

| JP | 57-133910 | * 3/1984 | ............. H01M 2/06 |
| JP | 59-41867 | 3/1984 | |

(Continued)

OTHER PUBLICATIONS

International Search Report in International Application No. PCT/JP2010/050289; Mailing Date: Apr. 27, 2010.

*Primary Examiner* — Ula C Ruddock
*Assistant Examiner* — Amanda Barrow
(74) *Attorney, Agent, or Firm* — Finnegan, Henderson, Farabow, Garrett & Dunner, LLP

(57) ABSTRACT

A current collector electrically connected to a first electrode plate or a second electrode plate includes a tubular current collection section. An external terminal electrically connected to the current collector includes a tubular terminal section into which the current collection section is inserted. The current collection section has, before being inserted into the terminal section, a greater outer diameter than the inner diameter of the terminal section. In the insertion process, the diameter of the current collection section is reduced or the diameter of the terminal section is expanded so that the outer diameter of the current collection section is equal to or smaller than the inner diameter of the terminal section, and then the current collection section is inserted into the terminal section. After that, the outer peripheral surface of the current collection section and the inner peripheral surface of the terminal section are made to be in close contact with each other by the restoring force of the current collection section having the reduced diameter or of the terminal section having the expanded diameter, and as a result, the current collection section is fixed to the terminal section.

6 Claims, 18 Drawing Sheets

(56) References Cited

U.S. PATENT DOCUMENTS

| | | | | |
|---|---|---|---|---|
| 2,926,210 A * | 2/1960 | Sturges | | H01M 2/06 174/153 G |
| 3,704,173 A * | 11/1972 | McClelland et al. | ... | H01M 2/06 292/314 |
| 3,839,093 A * | 10/1974 | Twogood | | H01B 17/30 411/82 |
| 4,006,282 A * | 2/1977 | Antoine | | H01M 2/30 429/181 |
| 4,394,059 A * | 7/1983 | Reynolds | | G03G 15/6538 29/623.1 |
| 4,859,547 A * | 8/1989 | Adams | | H01M 2/06 29/623.2 |
| 5,273,844 A * | 12/1993 | Casale | | H01M 2/30 429/101 |
| 5,677,078 A * | 10/1997 | Juergens | | H01M 2/0202 29/623.2 |
| 2001/0049054 A1* | 12/2001 | Enomoto et al. | | 429/158 |
| 2002/0110729 A1 | 8/2002 | Hozumi et al. | | |
| 2004/0095709 A1* | 5/2004 | Hata | | H01G 9/008 361/513 |
| 2004/0248002 A1* | 12/2004 | Asahina | | H01M 2/027 429/181 |
| 2005/0019654 A1* | 1/2005 | Kishida | | 429/178 |
| 2005/0278941 A1* | 12/2005 | Hamada | | H01M 2/0413 29/623.1 |
| 2006/0243028 A1* | 11/2006 | Nishio et al. | | 73/31.05 |
| 2007/0197099 A1* | 8/2007 | DiStefano | | 439/620.1 |
| 2008/0057394 A1* | 3/2008 | Rigobert | | H01M 2/0426 429/164 |

FOREIGN PATENT DOCUMENTS

| | | | | |
|---|---|---|---|---|
| JP | 3-22851 | | 5/1991 | |
| JP | 07-235289 | * | 9/1995 | ............. H01M 2/30 |
| JP | 2001-176495 | * | 6/2001 | ............. H01M 2/30 |
| JP | 2008-66302 | | 3/2008 | |
| JP | 2009-87693 | | 4/2009 | |
| WO | WO 01/24206 A1 | | 4/2001 | |

* cited by examiner

METHOD FOR MANUFACTURING BATTERY

CROSS-REFERENCE TO RELATED APPLICATIONS

This application is a national phase application of International Application No. PCT/JP2010/050289, filed Jan. 13, 2010, the contents of which are incorporated herein by reference.

TECHNICAL FIELD

The present invention relates to a method of manufacturing a battery.

BACKGROUND ART

Various connecting methods have been proposed for connecting an external terminal to a current collector that is electrically connected to a first electrode plate or a second electrode plate (see, for example, Patent Document 1).

RELATED ART DOCUMENTS

Patent Documents

Patent Document 1: JP2009-87693A

Patent Document 1 describes a method of manufacturing a rectangular nonaqueous electrolyte secondary battery. With the manufacturing method in Patent Document 1, before connecting a current collector to an electrode body (first electrode plate or second electrode plate) (before encasing the current collector inside a battery case), the current collector and an external terminal are connected using a crimped or caulked member. More particularly, an external terminal having a cylindrical crimped member and a current collector having a through hole are used to connect the current collector and the external terminal in which the crimped member of the external terminal is inserted into the through hole of the current collector and the distal end of the crimped member is crimped.

DISCLOSURE OF THE INVENTION

Problems to be Solved by the Invention

However, in the manufacturing method described above, when crimping the crimped member, it is necessary to dispose crimping molds above and below the crimped member, and further, the external terminal have to be supported so that the external terminal is not deformed when crimping is performed. For this reason, the crimping technique in Patent Document 1 could not be employed in a case, for example, where cylindrical batteries are manufactured, wherein a current collector and an external terminal are connected inside a battery case after the current collector connected to the electrode body has been encased in the battery case. More specifically, there is no space for disposing crimping molds for connecting the current collector and the external terminal inside the battery case, and also, it is difficult to support the external terminal so that the external terminal would not be deformed.

In the technique of connecting the current collector and the external terminal using a crimped member as with Patent Document 1, there is a possibility that the current collector and the external terminal may not reliably be brought into tight contact with each other, whereby electrical resistance (contact resistance) between the current collector and the external terminal may increase.

The present invention has been made in view of the circumstances and has a purpose to provide a battery manufacturing method, with which a current collector and an external terminal can be fastened together in tight contact with each other without using a crimped member to reduce electrical resistance (contact resistance) between them (the current collector and the external terminal).

Means of Solving the Problems

It is preferable that a method of manufacturing a battery including: an electrode assembly having a first electrode plate, a second electrode plate, and a separator; a current collector electrically connected to the first electrode plate or the second electrode plate and including a tubular current collector portion; and an external terminal electrically connected to the current collector and including a tubular terminal portion in which the tubular current collector portion is inserted, wherein the tubular current collector portion has an outside diameter larger than an inside diameter of the tubular terminal portion before the tubular current collector portion is inserted into the tubular terminal portion, and the method includes an insertion step of inserting the tubular current collector portion into the tubular terminal portion by reducing the diameter of the tubular current collector portion or increasing the diameter of the tubular terminal portion so that the outside diameter of the tubular current collector portion becomes equal to or smaller than the inside diameter of the tubular terminal portion, after which an outer circumferential surface of the tubular current collector portion and an inner circumferential surface of the tubular terminal portion are brought into tight contact with each other by a restoring force of the tubular current collector portion with the reduced diameter or the tubular terminal portion with the increased diameter so as to fasten the tubular current collector portion to the tubular terminal portion.

With the battery manufacturing method described above, as the current collector, one that includes "a tubular current collector portion having a larger outside diameter than the inside diameter of the tubular terminal portion before the tubular current collector portion is inserted into the tubular terminal portion" is used. In other words, as the external terminal, one that includes "a tubular terminal portion having a smaller inside diameter than the outside diameter of the tubular current collector portion before the tubular current collector portion is inserted into the tubular terminal portion" is used.

In the insertion step, the diameter of the tubular current collector portion is reduced so that the outside diameter of the tubular current collector portion becomes equal to or smaller than the inside diameter of the tubular terminal portion to insert the tubular current collector portion into the tubular terminal portion. Or, in the insertion step, the diameter of the tubular terminal portion is increased so that the outside diameter of the tubular current collector portion becomes equal to or smaller than the inside diameter of the tubular terminal portion to insert the tubular current collector portion into the tubular terminal portion. Thus the tubular current collector portion having a larger outside diameter than the inside diameter of the tubular terminal portion can be appropriately inserted into the tubular terminal portion.

Furthermore, after the insertion, the outer circumferential surface of the tubular current collector portion and the inner circumferential surface of the tubular terminal portion are brought into tight contact with each other by a restoring force of the tubular current collector portion with the reduced diameter so as to fasten the tubular current collector portion to the tubular terminal portion. The outside diameter of the tubular current collector portion is initially (before insertion) larger than the inside diameter of the tubular terminal portion. Thus, the tubular current collector portion with the reduced diameter exhibits a restoring force trying to increase the diameter to its initial size after the insertion, causing the outer circumferential surface of the tubular current collector portion to make tight contact with the inner circumferential surface of the tubular terminal portion and thereby fastening the tubular current collector portion to the tubular terminal portion.

Alternatively, after the insertion, the outer circumferential surface of the tubular current collector portion and the inner circumferential surface of the tubular terminal portion are brought into tight contact with each other by a restoring force of the tubular terminal portion with the increased diameter so as to fasten the tubular current collector portion to the tubular terminal portion. Since the inside diameter of the tubular terminal portion is initially (before insertion) smaller than the outside diameter of the tubular current collector portion, the tubular terminal portion with the increased diameter exhibits a restoring force trying to reduce the diameter to its initial size after the insertion, causing the inner circumferential surface of the tubular terminal portion to make tight contact with the outer circumferential surface of the tubular current collector portion and thereby fastening the tubular current collector portion to the tubular terminal portion.

With the battery manufacturing method described above, in this way, the current collector (tubular current collector portion) and the external terminal (tubular terminal portion) can be fastened together in tight contact with each other without using a crimped member. This reduces electrical resistance (contact resistance) between the current collector (tubular current collector portion) and the external terminal (tubular terminal portion).

The tubular current collector portion may form part of the current collector, or may form the entire current collector (current collector being the tubular current collector portion). One example of the tubular current collector portion that forms part of the current collector includes, for example, a current collector including a plate-like current collector portion to which the end face of an active material-uncoated portion (a portion not including a mixture layer containing an active material and consisting only of a current collector foil) of a first electrode plate or a second electrode plate is joined, and the tubular current collector portion formed to protrude from this plate-like current collector portion. One example of the tubular current collector portion that forms the entire current collector includes, for example, a tubular current collector forming part of a core around which the electrode assembly is wound and electrically connected to the first electrode plate or the second electrode plate (this being the tubular current collector portion).

One aspect of the invention provides the method of manufacturing a battery in which the tubular current collector portion includes a cut-out formed by cutting off part of a wall forming the tubular current collector portion, the cut-out extending from a distal end of the tubular current collector portion along an axis line direction, and the insertion step includes inserting the tubular current collector portion into the tubular terminal portion by resiliently reducing the diameter of the tubular current collector portion so as to compress the cut-out in the tubular current collector portion, after which the outer circumferential surface of the tubular current collector portion is brought into tight contact with the inner circumferential surface of the tubular terminal portion by a resilient restoring force of the tubular current collector portion, so that the tubular current collector portion is fastened to the tubular terminal portion.

In the battery manufacturing method described above, as the current collector, one that includes a tubular current collector portion having "a cut-out formed by cutting off part of the wall forming this tubular current collector portion such as to extend from the distal end of the tubular current collector portion along an axis line direction" is used. In the insertion step, the tubular current collector portion is resiliently reduced in diameter such as to compress the cut-out in the tubular current collector portion to insert the tubular current collector portion into the tubular terminal portion. Thus the tubular current collector portion can be smoothly inserted into the tubular terminal portion. Further, after the insertion, the tubular current collector portion can be fastened to the tubular terminal portion, with the outer circumferential surface of the tubular current collector portion making tight contact with the inner circumferential surface of the tubular terminal portion by the resilient restoring force (that acts to increase the diameter to its initial state) of the tubular current collector portion with the reduced diameter. Therefore, with the battery manufacturing method described above, electrical resistance (contact resistance) between the tubular current collector portion and the tubular terminal portion can be reduced.

Alternatively, another aspect of the invention provides the method of manufacturing a battery in which the tubular terminal portion includes a cut-out formed by cutting off part of a wall forming the tubular terminal portion, the cut-out extending from a distal end of the tubular terminal portion along an axis line direction, and the insertion step includes inserting the tubular current collector portion into the tubular terminal portion by resiliently increasing the diameter of the tubular terminal portion such that the cut-out in the tubular terminal portion is pushed apart, after which the inner circumferential surface of the tubular terminal portion is brought into tight contact with the outer circumferential surface of the tubular current collector portion by a resilient restoring force of the tubular terminal portion, so that the tubular current collector portion is fastened to the tubular terminal portion.

In the battery manufacturing method described above, as the external terminal, an external terminal including a tubular terminal portion having "a cut-out formed by cutting off part of the wall forming the tubular terminal portion such as to extend from the distal end of the tubular terminal portion along an axis line direction" is used. In the insertion step, the tubular terminal portion is resiliently increased in diameter such that the cut-out in the tubular terminal portion is pushed apart to insert the tubular current collector portion into the tubular terminal portion. Thus the tubular current collector portion can be smoothly inserted into the tubular terminal portion. Further, after the insertion, the tubular current collector portion can be fastened to the tubular terminal portion, with the inner circumferential surface of the tubular terminal portion making tight contact with the outer circumferential surface of the tubular current collector portion by the resilient restoring force (that acts to reduce the diameter to its initial state) of the tubular terminal portion with the increased diameter. Therefore, with the battery manufacturing method described above, electrical resistance (contact resistance) between the tubular current collector portion and the tubular terminal portion can be reduced.

Further, another aspect of the invention provides the method of manufacturing a battery in which the insertion step includes heating the tubular terminal portion to increase the diameter of the tubular terminal portion by thermal expansion and inserting the tubular current collector portion into the tubular terminal portion with the inside diameter of the tubular terminal portion being made larger than the outside diameter of the tubular current collector portion, after which the inner circumferential surface of the tubular terminal portion is brought into tight contact with the outer circumferential surface of the tubular current collector portion by the restoring force of the tubular terminal portion reducing its diameter as a temperature of the tubular terminal portion drops, so that the tubular current collector portion is fastened to the tubular terminal portion.

According to the battery manufacturing method described above, in the insertion step, the tubular terminal portion is heated to increase the diameter of the tubular terminal portion by thermal expansion, so that the tubular current collector portion is inserted into the tubular terminal portion with the inside diameter of the tubular terminal portion being made larger than the outside diameter of the tubular current collector portion. Thus the tubular current collector portion can be smoothly inserted into the tubular terminal portion. Further, after the insertion, the restoring force (that acts to reduce the diameter to the initial state) of the tubular terminal portion reducing its diameter as the temperature of the tubular terminal portion drops (to normal temperature) causes the inner circumferential surface of the tubular terminal portion to make tight contact with the outer circumferential surface of the tubular current collector portion, whereby the tubular current collector portion can be fastened to the tubular terminal portion. Therefore, with the battery manufacturing method described above, electrical resistance (contact resistance) between the tubular current collector portion and the tubular terminal portion can be reduced.

Furthermore, any of the battery manufacturing methods described above preferably further includes, after the insertion step, a welding step of welding the tubular current collector portion and the tubular terminal portion together while the tubular current collector portion is fastened to the tubular terminal portion with the inner circumferential surface of the tubular terminal portion and the outer circumferential surface of the tubular current collector portion being placed in tight contact with each other.

According to the battery manufacturing method described above, the tubular current collector portion is fastened to the tubular terminal portion, with the inner circumferential surface of the tubular terminal portion and the outer circumferential surface of the tubular current collector portion making tight contact with each other in the insertion step as described above. Further, according to the battery manufacturing method described above, in this state, in the welding step after the insertion step, the tubular current collector portion and the tubular terminal portion are welded together. Welding both members (the tubular current collector portion and the tubular terminal portion) together in this way, with the inner circumferential surface of the tubular terminal portion and the outer circumferential surface of the tubular current collector portion making tight contact with each other, further reduces electrical resistance between the tubular current collector portion and the tubular terminal portion.

MODE FOR CARRYING OUT THE INVENTION

EXAMPLE 1

Figure 1:
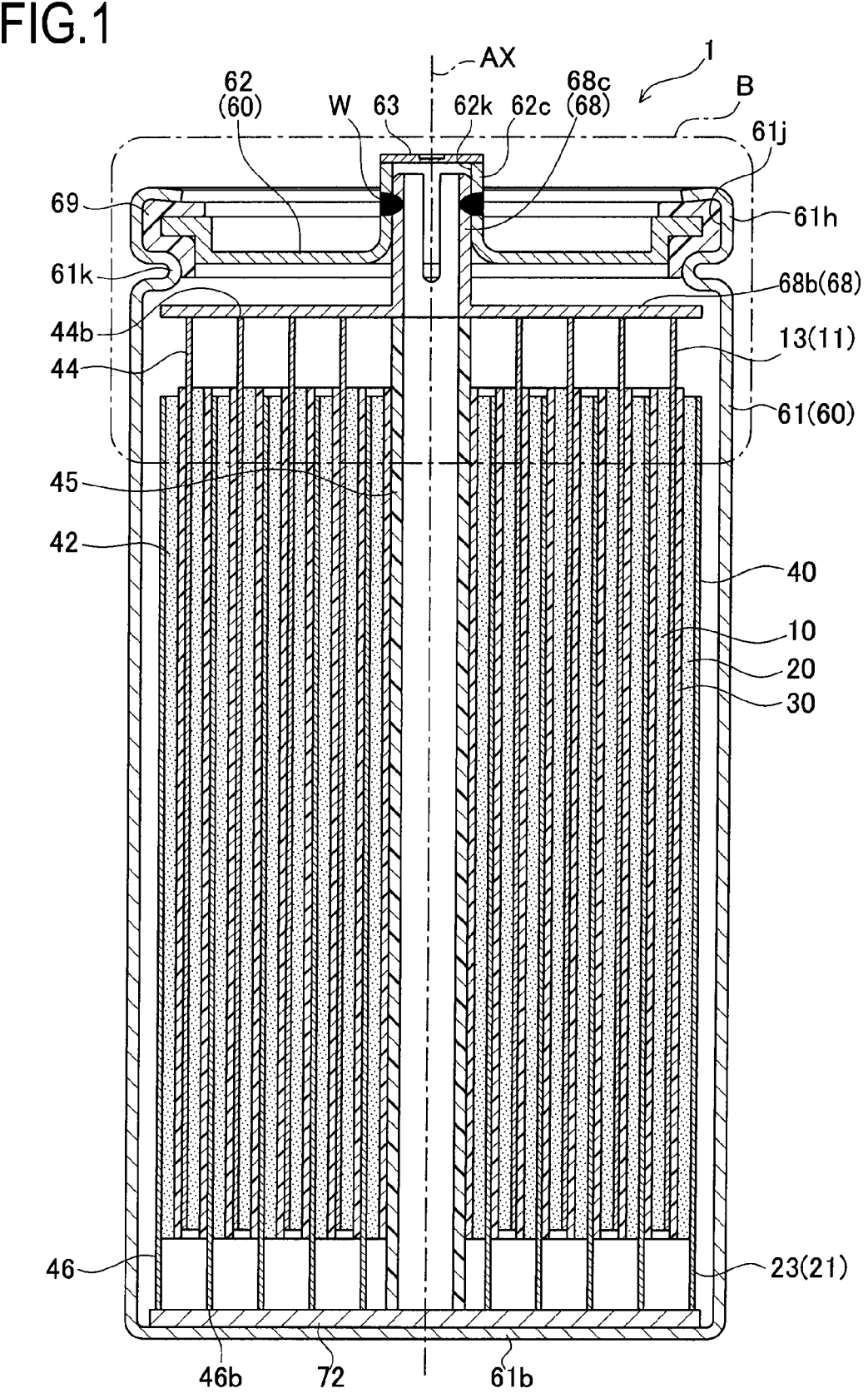
FIG. 1 is a longitudinal cross-sectional view of a battery of Example 1.

FIG. 1 is a longitudinal cross-sectional view (a section cut along an axis line AX) of a battery 1 of Example 1. The battery 1 of Example 1 is a cylindrical battery (see FIG. 1). This battery 1 includes a wound electrode assembly 40 and a battery case 60 accommodating this wound electrode assembly 40. Of these, the wound electrode assembly 40 is a cylindrical wound electrode assembly, formed by a first electrode plate 10 (a positive electrode plate), a second electrode plate 20 (a negative electrode plate), and separators 30 wound around the outer circumference of a core 45.

The wound electrode assembly 40 is actually a wound electrode assembly with fifty winding turns (a wound electrode assembly formed by winding a laminated assembly of the first electrode plate 10, second electrode plate 20, and separators 30 around the core 45 fifty times), but FIG. 1 and others show the wound electrode assembly 40 with a reduced number of winding turns (reduced to five winding turns).

The core 45 is a cylindrical member made of an electrically insulating resin.

Figure 7:
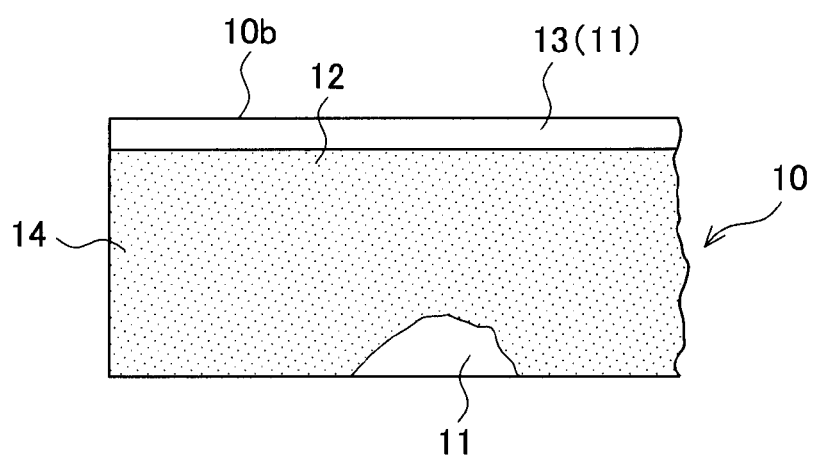
FIG. 7 is a view showing a first electrode plate of Example 1.

As shown in FIG. 7, the first electrode plate 10 has a first active material-coated portion 14 extending along one side 10b in the longitudinal direction (left to right direction in FIG. 7) in which a first current collector foil 11 extends, including the first current collector foil 11 and a first mixture layer 12, and a first active material-uncoated portion 13 formed only by the first current collector foil 11 and not including the first mixture layer 12, adjacent this first active material-coated portion 14 and extending along one side 10b in the longitudinal direction.

For the first current collector foil 11, for example, an aluminum foil may be used. The first mixture layer 12 is formed by a first active material, binder, and the like. For the first active material, for example, lithium nickel oxide may be used.

Figure 8:
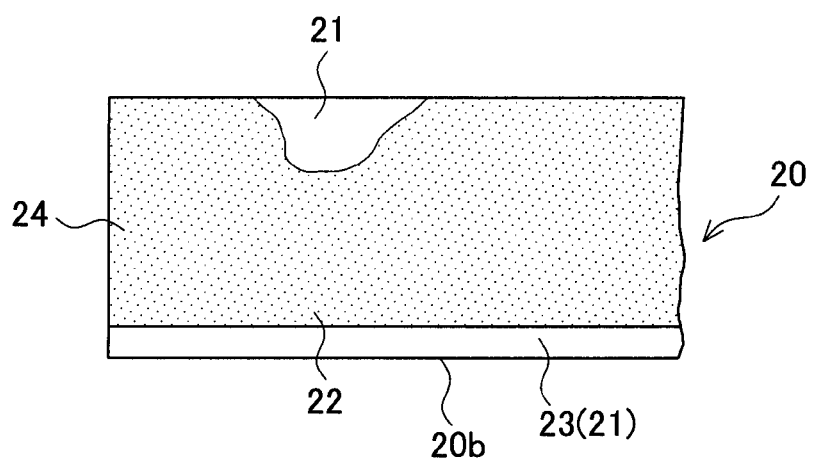
FIG. 8 is a view showing a second electrode plate of Example 1.

As shown in FIG. 8, the second electrode plate 20 has a second active material-coated portion 24 extending along one side 20b in the longitudinal direction (left to right direction in FIG. 8) in which a second current collector foil 21 extends, including the second current collector foil 21 and a second mixture layer 22, and a second active material-uncoated portion 23 formed only by the second current collector foil 21 and not including the second mixture layer 22, adjacent this second active material-coated portion 24 and extending along one side 20b in the longitudinal direction.

For the second current collector foil 21, for example, a copper foil may be used. The second mixture layer 22 is formed by a second active material, binder, and the like. For the second active material, for example, natural graphite may be used.

The part forming a distal end (upper end in FIG. 1) of the wound electrode assembly 40 in the axis line direction (in which the axis line AX extends, up and down direction in FIG. 1) where only the first active material-uncoated portion 13 of the first electrode plate 10 is wound will be referred to as a first wound portion 44. The part forming a rear end (a lower end in FIG. 1) of the wound electrode assembly 40 in the axis line direction where only the second active material-uncoated portion 23 of the second electrode plate 20 is wound will be referred to as a second wound portion 46. The part located between the first wound portion 44 and the second wound portion 46 where the first electrode plate 10 (first active material-coated portion 14), second electrode plate 20 (second active material-coated portion 24), and separators 30 are wound will be referred to as a power generating portion 42.

The first wound portion 44 (first active material-uncoated portion 13) is welded to a metal current collector 68 (more particularly, a plate-like current collector portion 68b of the current collector 68) at an end face 44b thereof (see FIG. 1). This electrically connects the first electrode plate 10 to the current collector 68 via the first wound portion 44.

Figure 3:
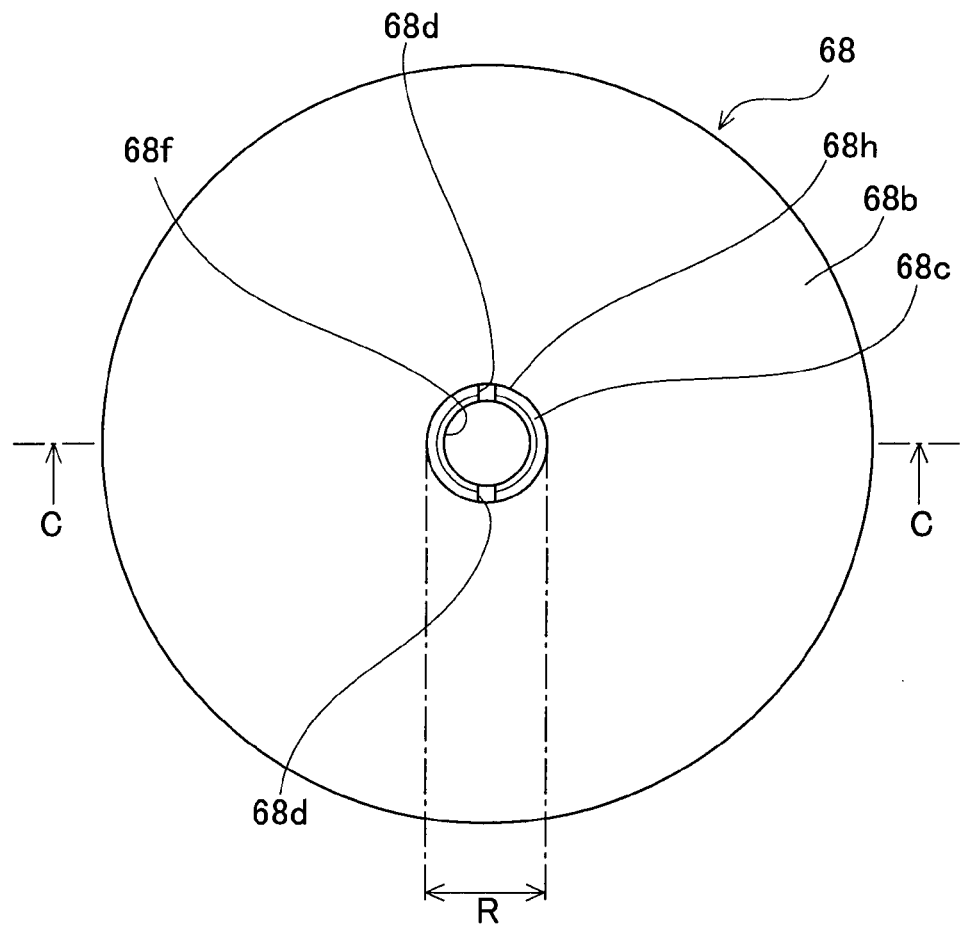
FIG. 3 is a top view of a current collector of Example 1.
Figure 4:
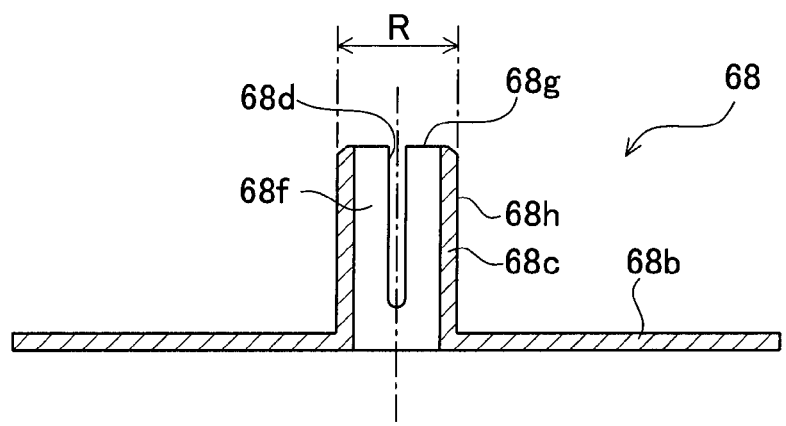
FIG. 4 is a longitudinal cross-sectional view of the current collector, corresponding to a section seen along arrows C-C in FIG. 3.

The current collector 68 includes the annular plate-like current collector portion 68b, and a tubular current collector portion 68c protruding from this plate-like current collector portion 68b, as shown in FIGS. 3 and 4. Of these, to the plate-like current collector portion 68b, the end face 44b of the first wound portion 44 (first active material-uncoated portion 13) is joined (see FIG. 1). The tubular current collector portion 68c is formed with a cut-out 68d formed by cutting off part of a wall 68f forming the tubular current collector portion 68c. This cut-out 68d is a slit-like cut-out extending from a distal end 68g of the tubular current collector portion 68c in the axis line direction (downward in FIG. 4). Thereby, the tubular current collector portion 68c can resiliently increase and decrease in diameter due to flexibility of the cut-out 68d.

In the current collector 68 of Example 1, two cut-outs 68d are formed at radially opposite positions of the tubular current collector portion 68c.

A battery case 60 is a cylindrical battery case, including a metal case body 61 in a cylindrical shape having a bottom, and a metal external terminal 62 (see FIG. 1). The external terminal 62 is disposed such as to close an opening 61j of the case body 61, and fastened to the case body 61 by crimping an opening portion 61h forming the opening 61j. Between the external terminal 62 and the opening portion 61h, an annular gasket 69 made of an electrically insulating resin is interposed. Thereby, the case body 61 accommodating the wound electrode assembly 40 and the external terminal 62 are united, while electrical insulation is provided between the case body 61 and the external terminal 62, to form the battery case 60.

Figure 5:
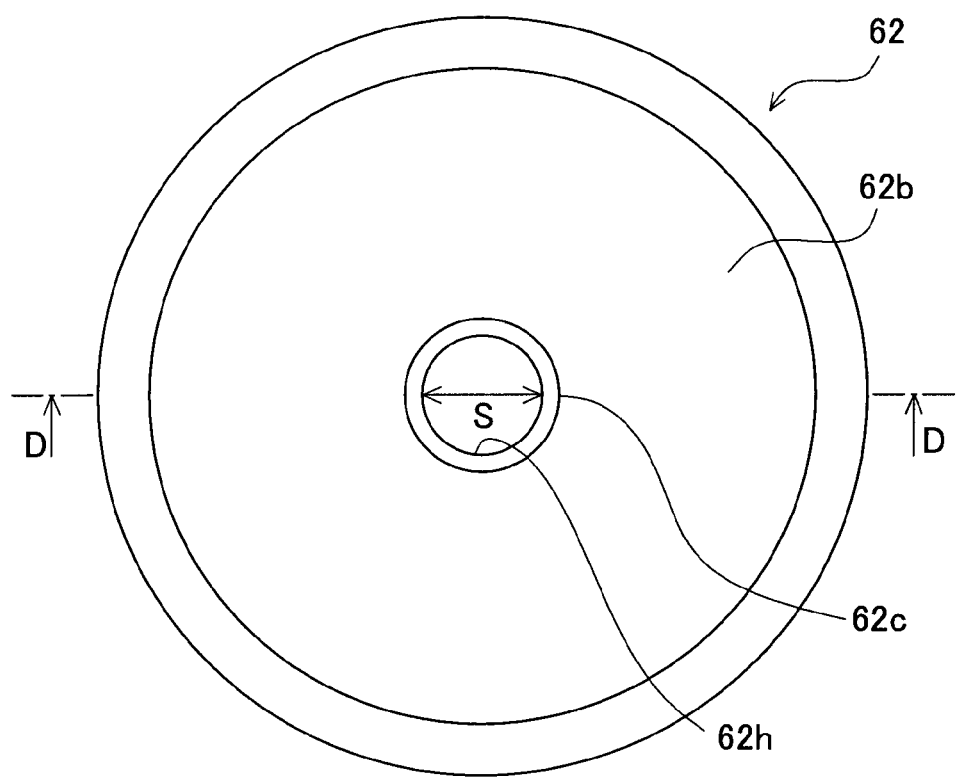
FIG. 5 is a top view of an external terminal of Examples 1 and 3.
Figure 6:
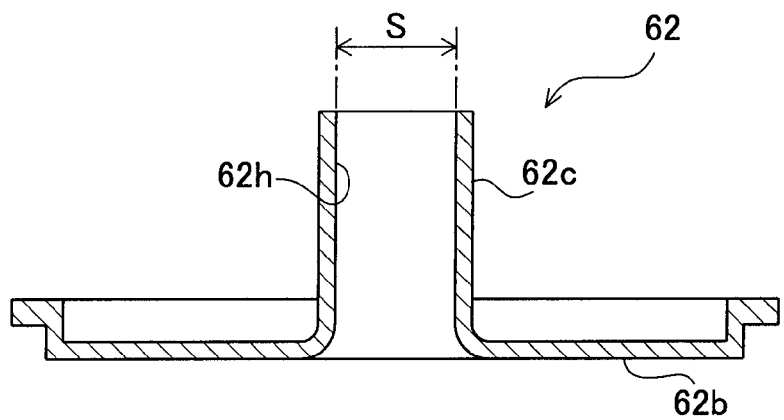
FIG. 6 is a longitudinal cross-sectional view of the external terminal, corresponding to a section seen along arrows D-D in FIG. 5.

The external terminal 62 (first external terminal, or external positive terminal) includes an annular plate-like terminal portion 62b and a tubular terminal portion 62c protruding from this plate-like terminal portion 62b, as shown in FIGS. 5 and 6. Of these, into the tubular terminal portion 62c is inserted the tubular current collector portion 68c of the current collector 68 (see FIGS. 1 and 2). This electrically connects the external terminal 62 to the current collector 68 (tubular current collector portion 68c).

Note, in Example 1, the tubular current collector portion 68c before being inserted into the tubular terminal portion 62c has a larger outside diameter R than an inside diameter S of the tubular terminal portion 62c (see FIGS. 3 to 6). In other words, before the tubular current collector portion 68c is inserted into the tubular terminal portion 62c, the tubular terminal portion 62c has a smaller inside diameter S than the outside diameter R of the tubular current collector portion 68c. Namely, before the tubular current collector portion 68c is inserted into the tubular terminal portion 62c, the outside diameter R of the tubular current collector portion 68c is larger than the inside diameter S of the tubular terminal portion 62c.

Therefore, when the tubular current collector portion 68c is inserted into the tubular terminal portion 62c, the tubular current collector portion 68c is resiliently reduced in diameter as the cut-outs 68d in the tubular current collector portion 68c are compressed, so that the tubular current collector portion 68c is inserted into the tubular terminal portion 62c. For this reason, after the insertion, an outer circumferential surface 68h of the tubular current collector portion 68c makes tight contact with an inner circumferential surface 62h of the tubular terminal portion 62c owing to the resilient restoring force (that acts to increase the diameter to its initial state) of the tubular current collector portion 68c, so that the tubular current collector portion 68c is fastened to the tubular terminal portion 62c (see FIG. 12). This reduces electrical resistance (contact resistance) between the tubular current collector portion 68c and the tubular terminal portion 62c.

Figure 2:
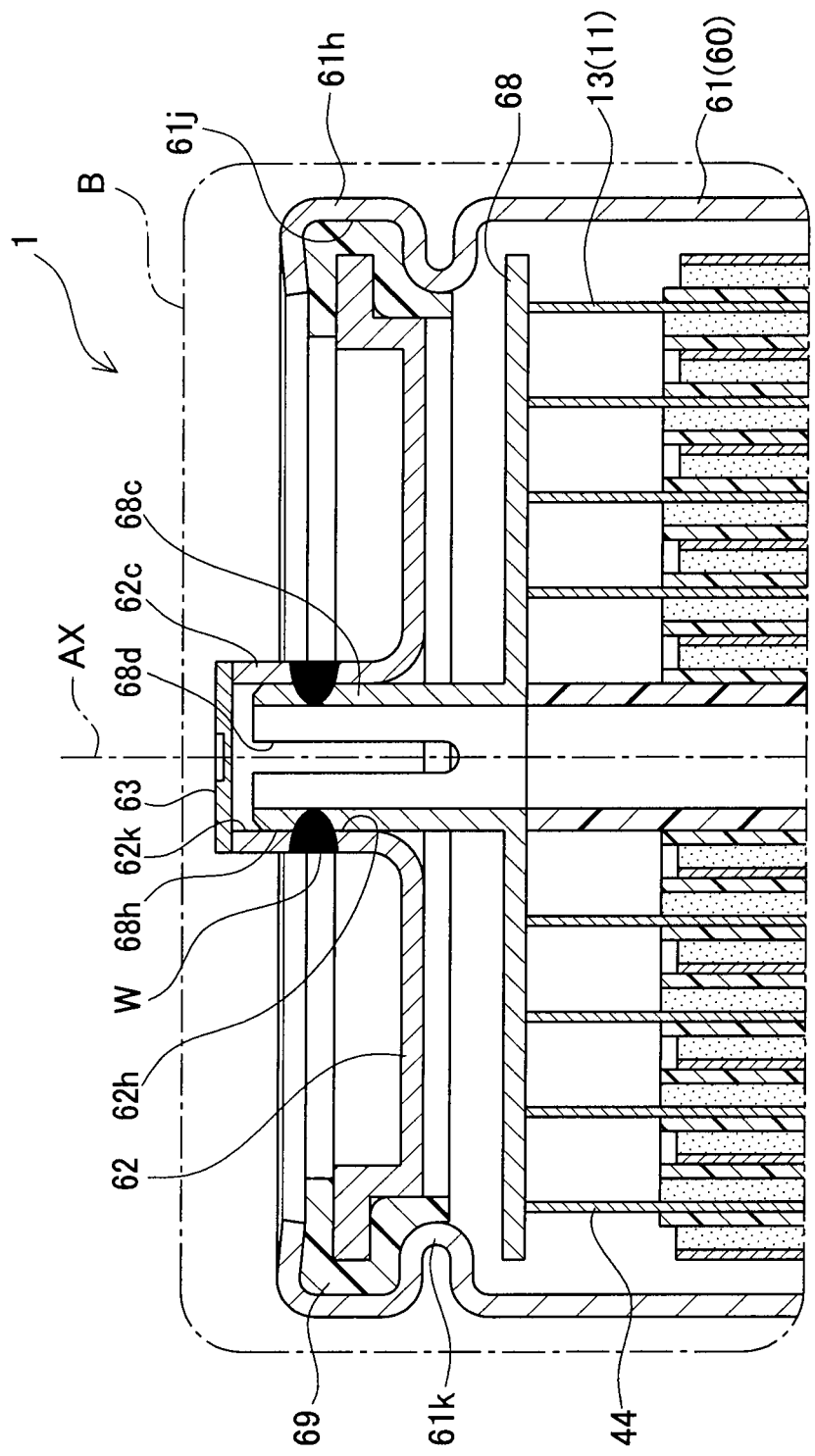
FIG. 2 is an enlarged view of a part B in FIG. 1.

Furthermore, in the battery 1 of Example 1, both members (the tubular current collector portion 68c and the tubular terminal portion 62c) are welded together (see FIG. 2), with the outer circumferential surface 68h of the tubular current collector portion 68c making tight contact with the inner circumferential surface 62h of the tubular terminal portion 62c owing to the resilient restoring force of the tubular current collector portion 68c. This further reduces electrical resistance between the tubular current collector portion 68c and the tubular terminal portion 62c in the battery 1 of Example 1. In FIGS. 1 and 2, the part where the tubular current collector portion 68c and the tubular terminal portion 62c are welded together is denoted as a welded portion W (blacked-out portions in FIGS. 1 and 2).

The second wound portion 46 (second active material-uncoated portion 23) is welded to a metal current collector member 72 having a generally disc-like shape at an end face 46b thereof (see FIG. 1). The current collector member 72 is further welded to a bottom 61b of the case body 61. Thus, in the battery 1 of Example 1, the bottom 61b of the case body 61 is electrically connected to the second wound portion 46 (second electrode plate 20) via the current collector member 72 to form a second external terminal (external negative terminal).

To the distal end face of the tubular terminal portion 62c, a generally disc-like safety vent 63 is welded (see FIG. 1). This safety vent 63 closes an opening 62k at the distal end of the tubular terminal portion 62c and hermetically seals the battery 1. This safety vent 63 is formed such as to open by breaking open itself when internal pressure of the battery 1 (pressure inside the battery case 60) builds up and reaches a predetermined vent-opening pressure. The safety vent 63 opens to discharge gas from the inside of the battery 1 (battery case 60) to the outside, thus preventing excessive buildup of internal pressure of the battery 1 (pressure inside the battery case 60).

Next, the method of manufacturing the battery 1 of Example 1 will be described below.

First, the first electrode plate 10 in which the first mixture layer 12 is formed on the surface of a strip-shaped first current collector foil 11 is prepared, as shown in FIG. 7. This first electrode plate 10 includes a first active material-coated portion 14 extending along one side 10b in the longitudinal direction (left to right direction in FIG. 7) in which the first current collector foil 11 extends, including the first current collector foil 11 and the first mixture layer 12, and the first active material-uncoated portion 13 formed only by the first current collector foil 11 and not including the first mixture layer 12, adjacent this first active material-coated portion 14 and extending along one side 10b in the longitudinal direction.

Further, the second electrode plate 20 in which the second mixture layer 22 is formed on the surface of a strip-shaped second current collector foil 21 is prepared, as shown in FIG. 8. This second electrode plate 20 includes the second active material-coated portion 24 extending along one side 20b in the longitudinal direction (left to right direction in FIG. 8) in which the second current collector foil 21 extends, including the second current collector foil 21 and the second mixture layer 22, and the second active material-uncoated portion 23 formed only by the second current collector foil 21 and not including the second mixture layer 22, adjacent this second active material-coated portion 24 and extending along one side 20b in the longitudinal direction.

The separator 30 made of an electrically insulating porous resin is also prepared.

Figure 9:
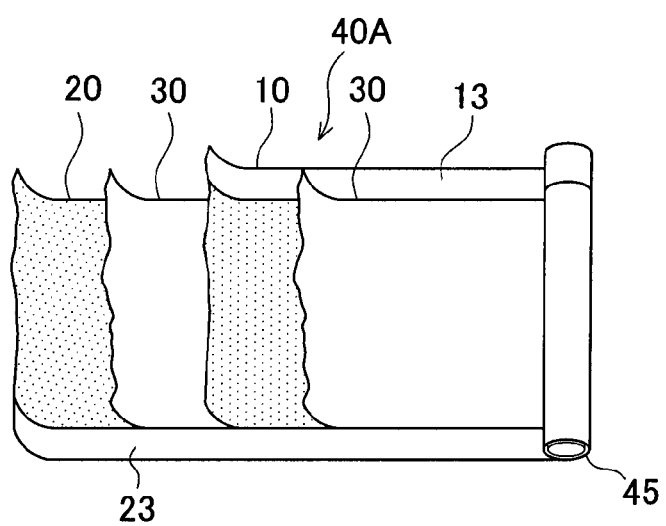
FIG. 9 is an explanatory view to show a winding step of Example 1.

Next, in a lamination step, the second electrode plate 20, separator 30, first electrode plate 10, and separator 30 are laminated one on another in this order (see FIG. 9). More specifically, they are laminated one on another such that the first active material-uncoated portion 13 of the first electrode plate 10 and the second active material-uncoated portion 23 of the second electrode plate 20 are located oppositely from each other in the width direction (up and down direction in FIG. 9), and such that the first active material-uncoated portion 13 does not overlap the separator 30 and the second electrode plate 20 and that the second active material-uncoated portion 23 does not overlap the separator 30 and the first electrode plate 10.

Next, the process goes to a winding step, where, as shown in FIG. 9, a laminated assembly 40A of the second electrode plate 20, first electrode plate 10, and separators 30 laminated one on another is wound around the cylindrical core 45. Thus the cylindrical wound electrode assembly 40 is formed (see FIG. 10). In Example 1, the laminated assembly 40A is wound 50 times around the core 45.

Figure 10:
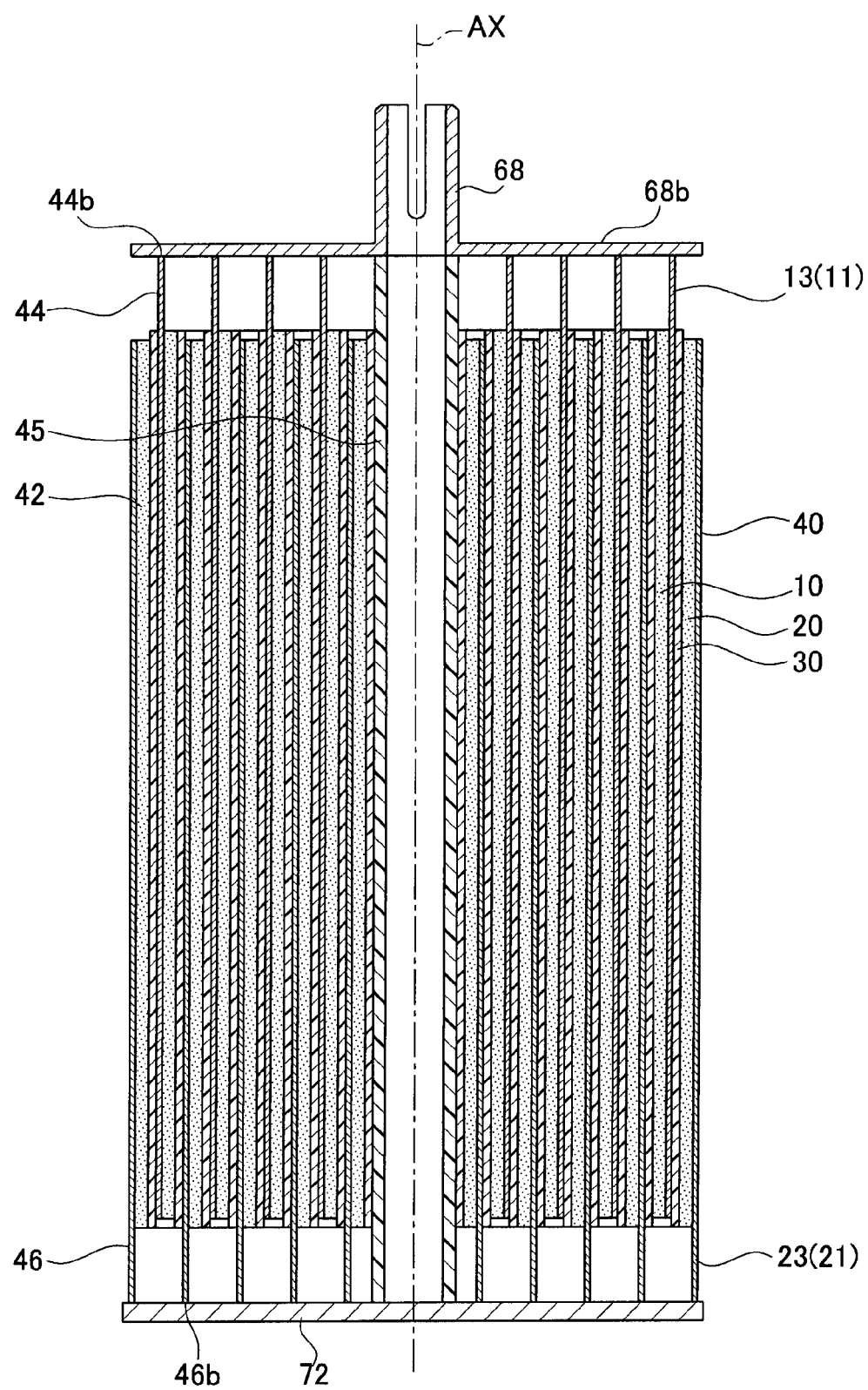
FIG. 10 is an explanatory view to show a joining step of joining a wound electrode assembly to a current collector.

After that, the current collector member 72 is welded to the second wound portion 46 (see FIG. 10). More specifically, the second wound portion 46 is laser-welded to the current collector member 72, such that, with the end face 46b of the second wound portion 46 being abutted to the current collector member 72, a laser beam is irradiated to a surface of the current collector member 72 (surface opposite from the surface to which the second wound portion 46 is abutted, lower surface in FIG. 10). Thus the second electrode plate 20 is electrically connected to the current collector member 72 via the second wound portion 46.

Next, the process goes to a joining step, where the current collector 68 is welded to the first wound portion 44 (see FIG. 10). More specifically, the first wound portion 44 is laser-welded to the current collector 68, such that, with the end face 44b of the first wound portion 44 being abutted to the plate-like current collector portion 68b of the current collector 68, a laser beam is irradiated to a surface of the plate-like current collector portion 68b (surface opposite from the surface to which the first wound portion 44 is abutted, upper surface in FIG. 10). Thus the first electrode plate 10 is electrically connected to the current collector 68 via the first wound portion 44.

Figure 11:
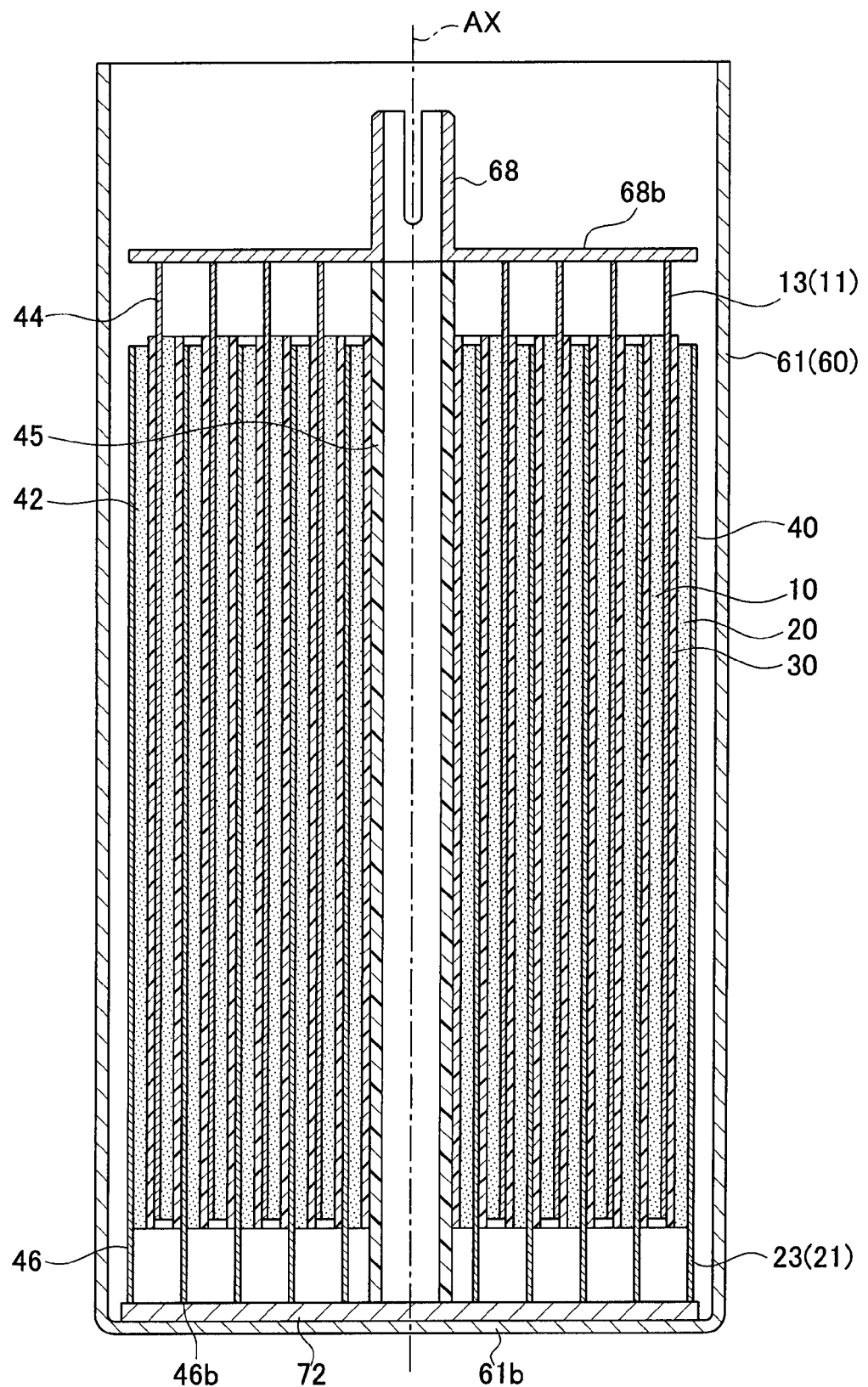
FIG. 11 is an explanatory view to show an encasing step of Example 1.

Next, the process goes to an encasing step, where, as shown in FIG. 11, the wound electrode assembly 40 to which the current collector 68 and the current collector member 72 have been welded is accommodated inside the case body 61. In this step, the current collector member 72 welded to the second wound portion 46 makes contact with the bottom 61b of the case body 61.

After that, the current collector member 72 is welded to the bottom 61b of the case body 61. More specifically, the current collector member 72 is laser-welded to the bottom 61b of the case body 61 by irradiating a laser beam to an outer surface of the bottom 61b of the case body 61. Thus the bottom 61b of the case body 61 is electrically connected to the second wound portion 46 (second electrode plate 20) via the current collector member 72 to form the second external terminal.

Figure 12:
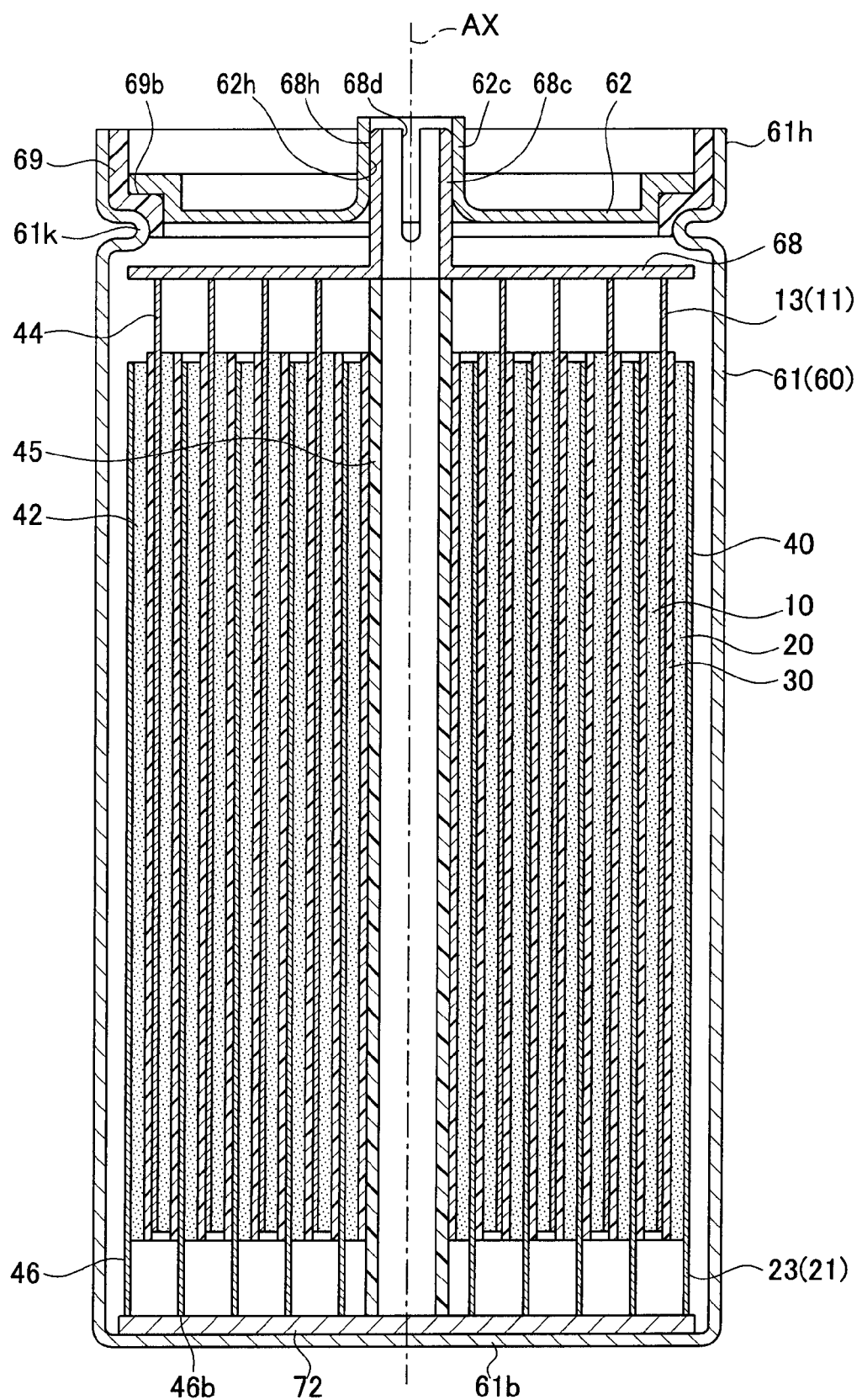
FIG. 12 is an explanatory view to show an insertion step of Example 1.

Next, as shown in FIG. 12, part of the distal end in the axis line direction (upper side in FIG. 12) of the case body 61 is deformed radially inwards (toward the axis line AX) all around the case body 61 to form an annular step or protrusion 61k. After that, an annular gasket 69 is disposed inside the opening portion 61h of the case body 61. The position of the gasket 69 relative to the case body 61 is determined by placing the gasket 69 onto the annular step 61k.

Next, the process goes to an insertion step, where, as shown in FIG. 12, the tubular current collector portion 68c of the current collector 68 is inserted into the tubular terminal portion 62c of the external terminal 62. More specifically, with the tubular current collector portion 68c being inserted into the tubular terminal portion 62c, the external terminal 62 is disposed inside the opening portion 61h (more particularly, inside the gasket 69) of the case body 61. The position of the external terminal 62 relative to the case body 61 is determined by placing the external terminal onto 62a step or shoulder 69b of the gasket 69.

Note that the tubular current collector portion 68c of Example 1 has the cut-outs 68d formed by cutting off part of the wall 68f that forms the tubular current collector portion 68c. These cut-outs 68d are slit-like cut-outs extending from the distal end 68g of the tubular current collector portion 68c in the axis line direction (downward in FIG. 4). Thereby, the tubular current collector portion 68c can resiliently increase and decrease in diameter due to flexibility of the cut-outs 68d.

Furthermore, in Example 1, the tubular current collector portion 68c before being inserted into the tubular terminal portion 62c has the outside diameter R larger than the inside diameter S of the tubular terminal portion 62c (see FIGS. 3 to 6). In other words, the tubular terminal portion 62c has the inside diameter S smaller than the outside diameter R of the tubular current collector portion 68c before the tubular current collector portion 68c is inserted into the tubular terminal portion 62c. Namely, before the tubular current collector portion 68c is inserted into the tubular terminal portion 62c, the outside diameter R of the tubular current collector portion 68c is larger than the inside diameter S of the tubular terminal portion 62c.

Therefore, in the insertion step of Example 1, the tubular current collector portion 68c is resiliently reduced in diameter as the cut-outs 68d in the tubular current collector portion 68c are compressed such that the outside diameter R of the tubular current collector portion 68c becomes equal to or smaller than the inside diameter S of the tubular terminal portion 62c, so that the tubular current collector portion 68c is inserted into the tubular terminal portion 62c. For this reason, after the insertion, the outer circumferential surface 68h of the tubular current collector portion 68c makes tight contact with the inner circumferential surface 62h of the tubular terminal portion 62c owing to the resilient restoring force (that acts to increase the diameter to its initial state) of the tubular current collector portion 68c, so that the tubular current collector portion 68c is fastened to the tubular terminal portion 62c (see FIG. 12). This electrically connects the tubular current collector portion 68c to the tubular terminal portion 62c.

With the manufacturing method of Example 1, in this way, the current collector 68 (tubular current collector portion 68c) and the external terminal 62 (tubular terminal portion 62c) can be fastened together in tight contact with each other without using a crimped member. This reduces electrical resistance (contact resistance) between the current collector 68 (tubular current collector portion 68c) and the external terminal 62 (tubular terminal portion 62c).

Figure 13:
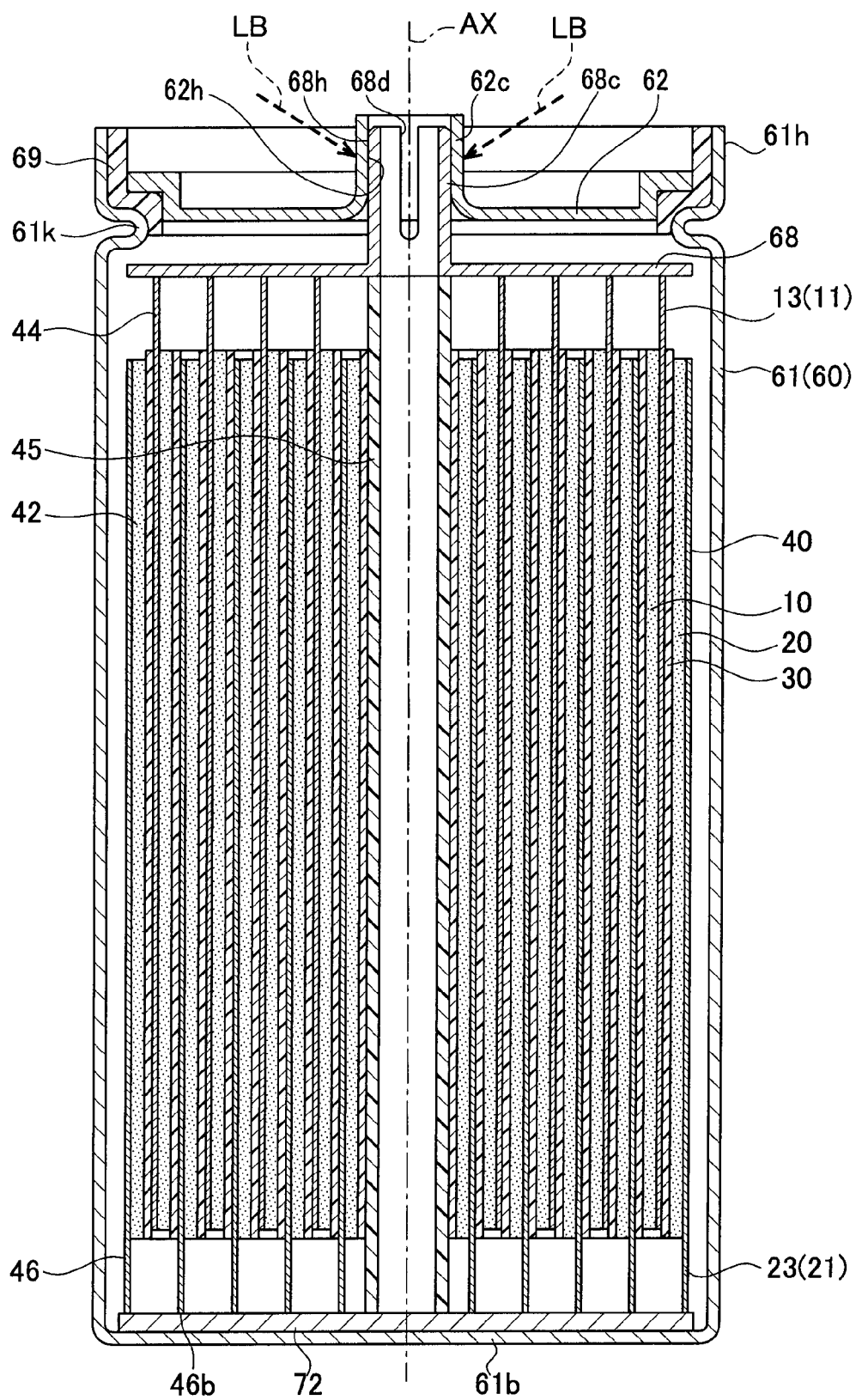
FIG. 13 is an explanatory view to show a welding step of Example 1.

Next, the process goes to a welding step, where the tubular current collector portion 68c that has been inserted and fastened inside the tubular terminal portion 62c is welded to the tubular terminal portion 62c. More specifically, as shown in FIG. 13, the tubular terminal portion 62c is laser-welded to the tubular current collector portion 68c by irradiating a laser beam LB all around from outside the tubular terminal portion 62c. In Example 1, in particular, both members (the tubular current collector portion 68c and the tubular terminal portion 62c) can be welded together, with the outer circumferential surface 68h of the tubular current collector portion 68c making tight contact with the inner circumferential surface 62h of the tubular terminal portion 62c owing to the resilient restoring force of the tubular current collector portion 68c. This further reduces electrical resistance between the tubular current collector portion 68c and the tubular terminal portion 62c.

Next, the opening portion 61h forming the opening 61j of the case body 61 is crimped to fasten the external terminal 62 together with the gasket 69 to the case body 61 (see FIGS. 1 and 2). Thereby, the case body 61 and the external terminal 62 are united, while electrical insulation is provided between the case body 61 and the external terminal 62 by the gasket 69, to form the battery case 60. After that, liquid electrolyte is poured into the case body 61 through the tube of the tubular current collector portion 68c. After that, the safety vent 63 is welded all around to the distal end face of the tubular terminal portion 62c. This closes the opening 62k at the distal end of the tubular terminal portion 62c, and the sealed battery 1 is complete.

EXAMPLE 2

Next, a battery 100 of Example 2 will be described. The battery 100 of Example 2 is different from the battery 1 of Example 1 in the configurations of the current collector (more particularly, tubular current collector portion) and the external terminal (more particularly, tubular terminal portion), and is otherwise generally the same as Example 1. Therefore, the difference from Example 1 will be mainly described here and description of similar features will be omitted or simplified.

Figure 14:
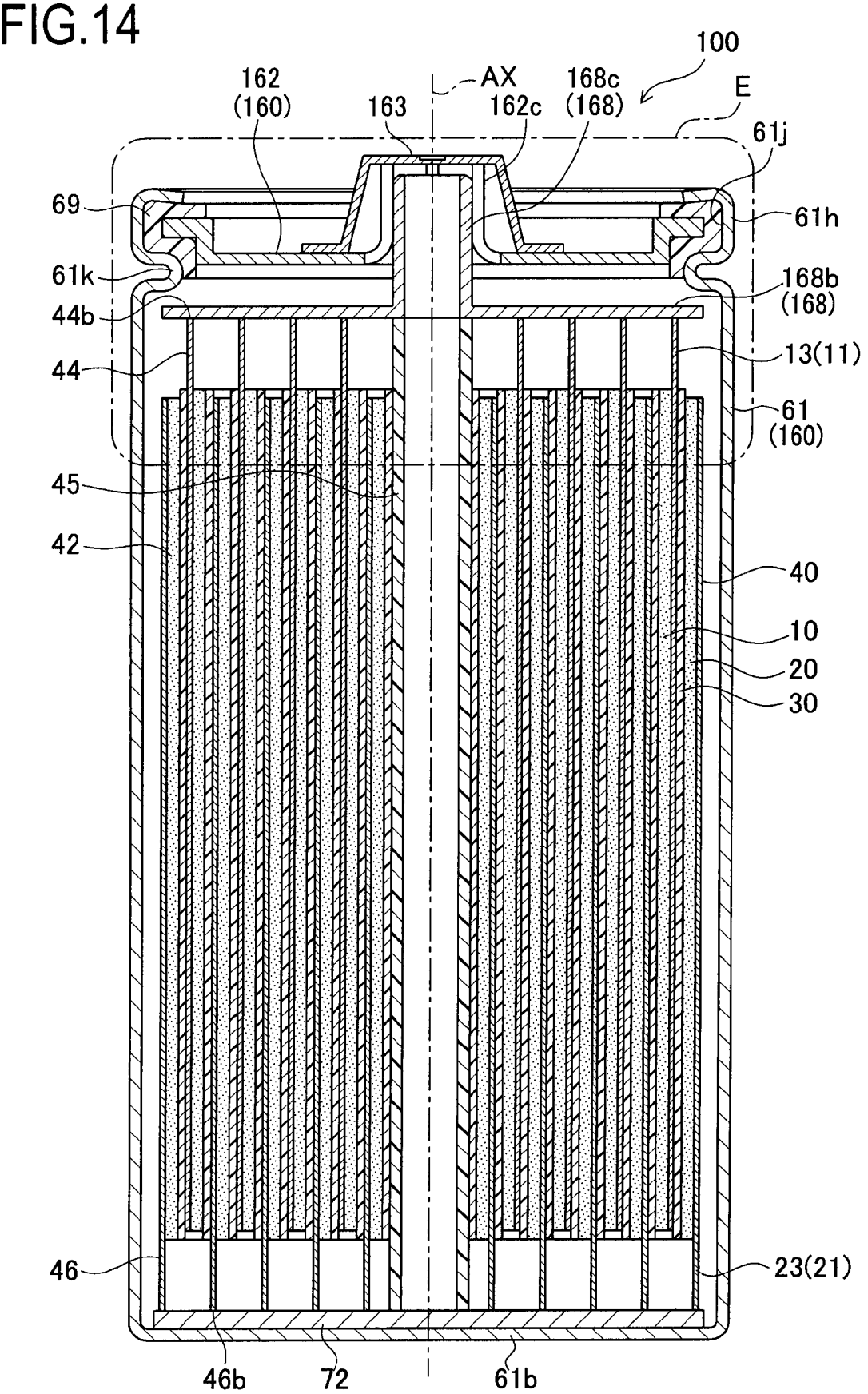
FIG. 14 is a longitudinal cross-sectional view of a battery of Example 2.

FIG. 14 is a longitudinal cross-sectional view (a cross-sectional view cut along the axis line AX) of the battery 100 of Example 2. The battery 100 of Example 2 uses a current collector 168 instead of the current collector 68 of Example 1, and an external terminal 162 instead of the external terminal 62 of Example 1. It uses a safety vent 163 instead of the safety vent 63 of Example 1.

Figure 16:
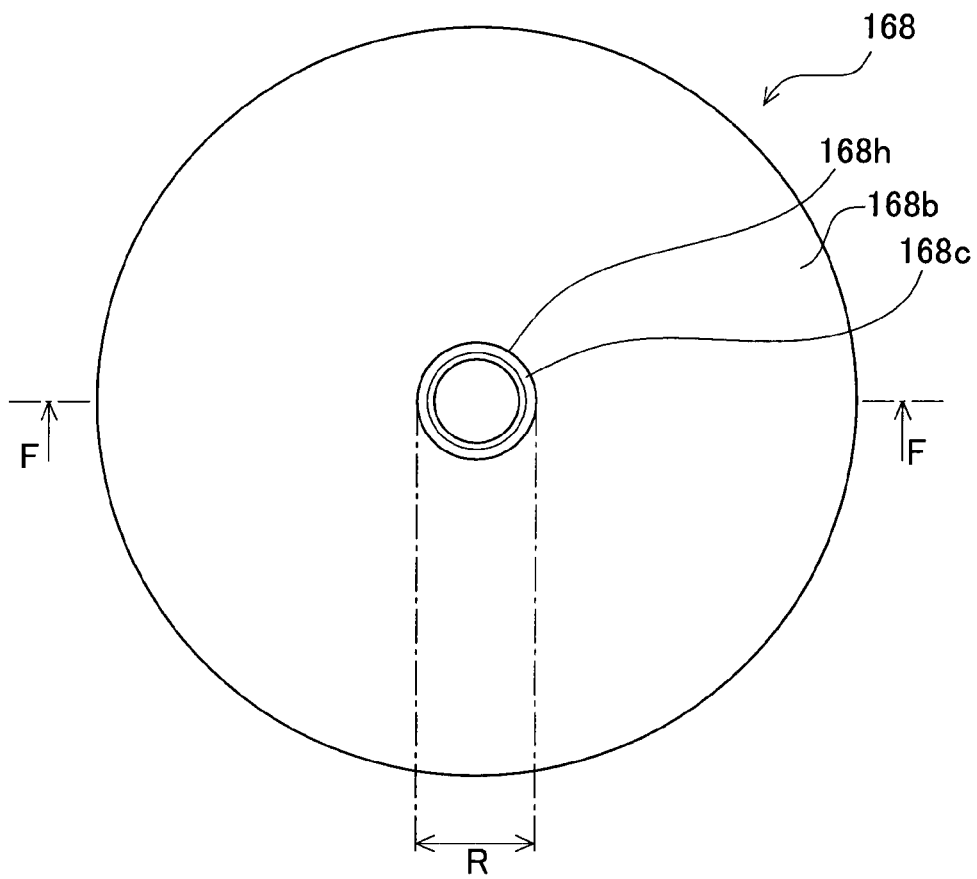
FIG. 16 is a top view of a current collector of Examples 2 and 3.
Figure 17:
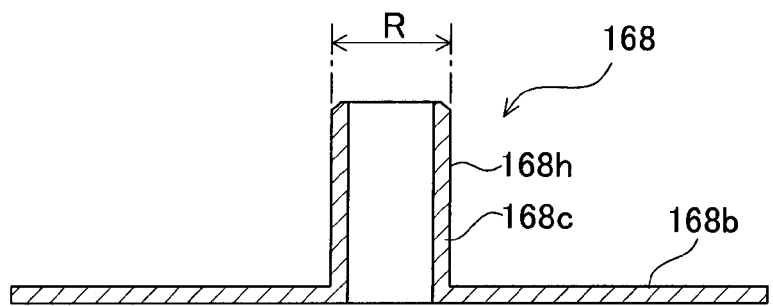
FIG. 17 is a longitudinal cross-sectional view of the current collector, corresponding to a section seen along arrows F-F in FIG. 16.

The current collector 168 includes, as shown in FIGS. 16 and 17, a plate-like current collector portion 168b similar to the plate-like current collector portion 68b of Example 1, and a tubular current collector portion 168c protruding from this plate-like current collector portion 168b. Unlike the current collector 68 of Example 1, the tubular current collector portion 168c of the current collector 168 of Example 2 is not formed with cut-outs. Namely, the tubular current collector portion 168c of Example 2 is cylindrical without any cut-outs.

Figure 18:
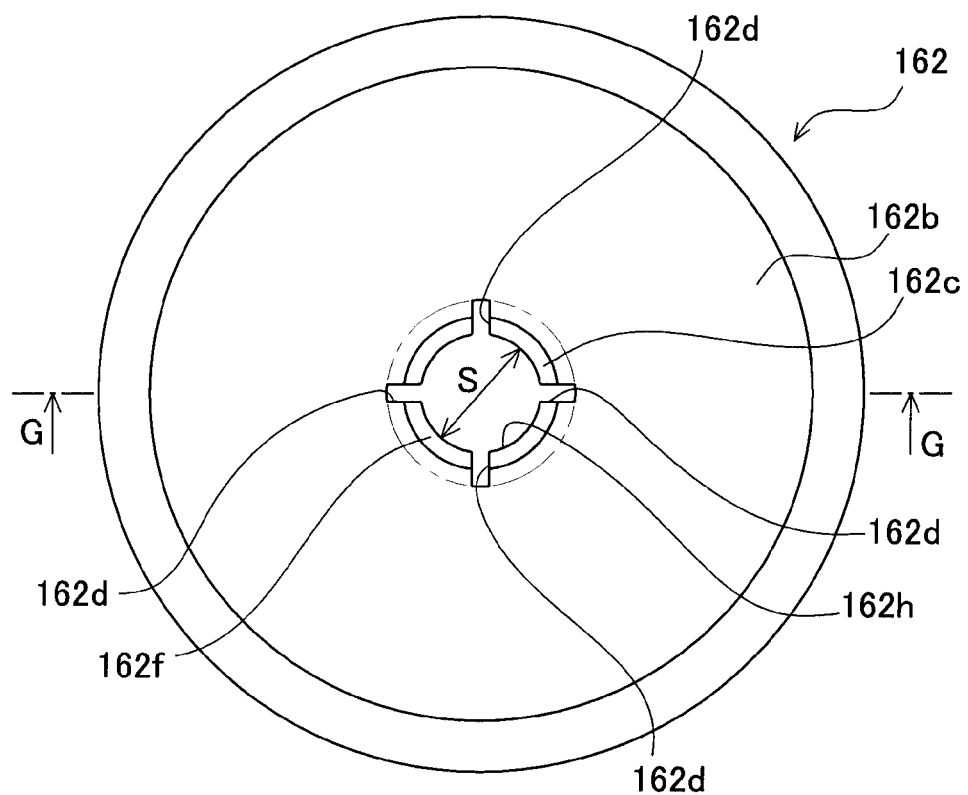
FIG. 18 is a top view of an external terminal of Example 2.
Figure 19:
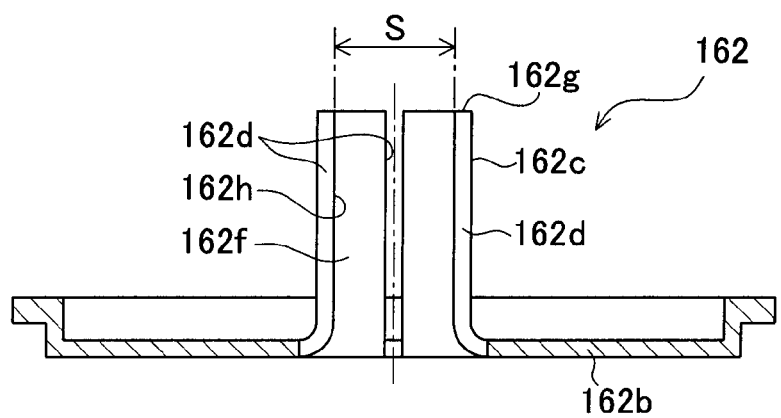
FIG. 19 is a longitudinal cross-sectional view of the external terminal, corresponding to a section seen along arrows G-G in FIG. 18.

The external terminal 162 includes, as shown in FIGS. 18 and 19, a plate-like terminal portion 162b similar to the plate-like terminal portion 62b of Example 1, and a tubular terminal portion 162c protruding from this plate-like terminal portion 162b. The tubular terminal portion 162c of Example 2 has a cut-out 162d formed by cutting off part of a wall 162f that forms the tubular terminal portion 162c. This cut-out 162d is a slit-like cut-out extending from a distal end 162g of the tubular terminal portion 162c in the axis line direction (downward in FIG. 19). Thereby, the tubular terminal portion 162c can resiliently increase and decrease in diameter due to flexibility of the cut-out 162d.

In the external terminal 162 of Example 2, the tubular terminal portion 162c is formed with four circumferentially regularly spaced cut-outs 162d.

Figure 15:
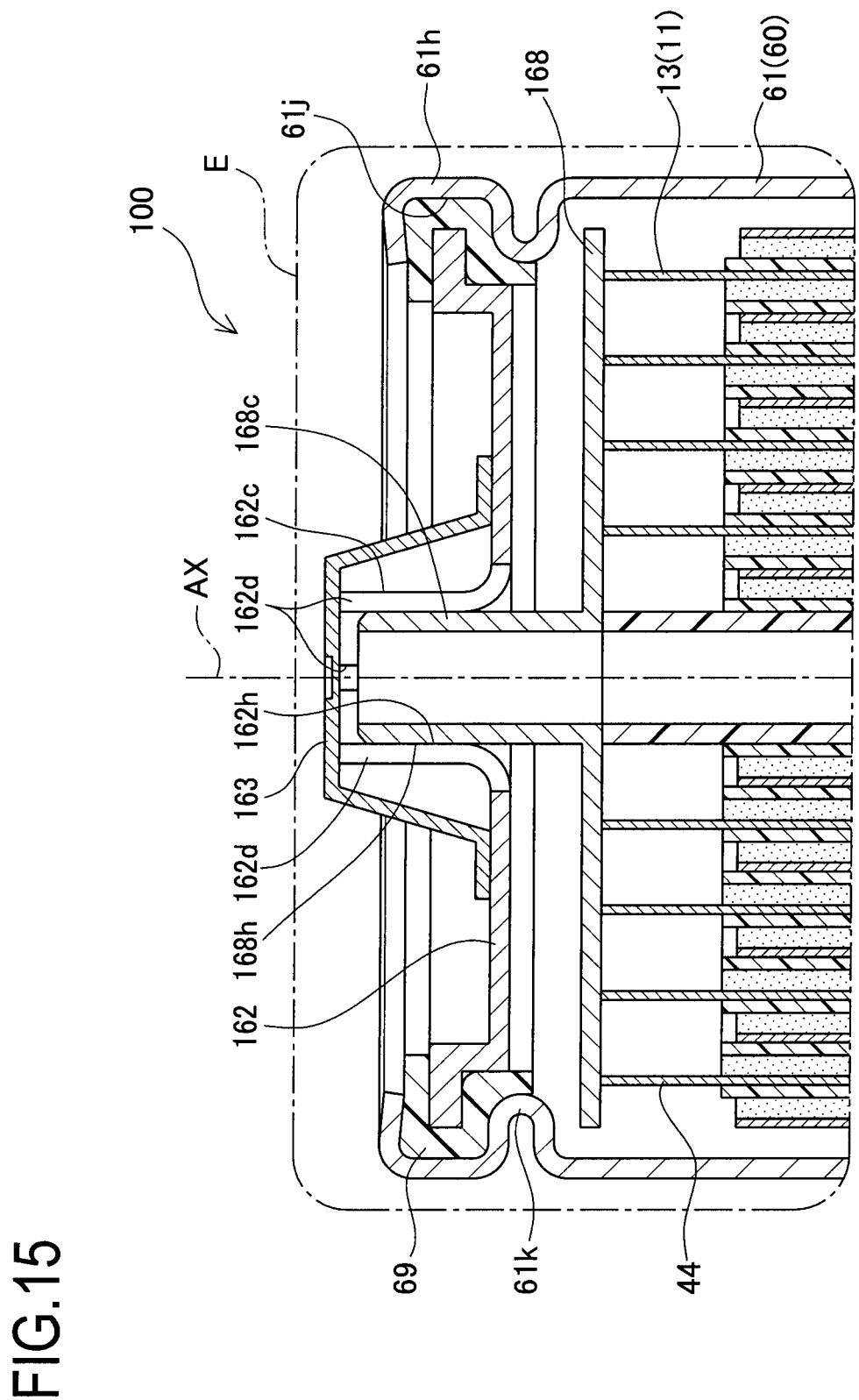
FIG. 15 is an enlarged view of a part E in FIG. 14.

Similarly to Example 1, into the tubular terminal portion 162c, the tubular current collector portion 168c of the current collector 168 is inserted (see FIGS. 14 and 15). This electrically connects the external terminal 162 to the current collector 168 (tubular current collector portion 168c).

Note, in Example 2, too, the tubular current collector portion 168c before being inserted into the tubular terminal portion 162c has a larger outside diameter R than an inside diameter S of the tubular terminal portion 162c (see FIGS. 16 to 19). In other words, the tubular terminal portion 162c has the inside diameter S smaller than the outside diameter R of the tubular current collector portion 168c before the tubular current collector portion 168c is inserted into the tubular terminal portion 162c. Namely, before the tubular current collector portion 168c is inserted into the tubular terminal portion 162c, the outside diameter R of the tubular current collector portion 168c is larger than the inside diameter S of the tubular terminal portion 162c.

Therefore, when the tubular current collector portion 168c is inserted into the tubular terminal portion 162c, the tubular terminal portion 162c is resiliently increased in diameter as the cut-outs 162*d* in the tubular terminal portion 162*c* are pushed apart, so that the tubular current collector portion 168*c* is inserted into the tubular terminal portion 162*c*. For this reason, after the insertion, an inner circumferential surface 162*h* of the tubular terminal portion 162*c* makes tight contact with an outer circumferential surface 168*h* of the tubular current collector portion 168*c* owing to the resilient restoring force (that acts to reduce the diameter to its initial state) of the tubular terminal portion 162*c*, so that the tubular current collector portion 168*c* is fastened to the tubular terminal portion 162*c* (see FIG. 20). This reduces electrical resistance (contact resistance) between the tubular current collector portion 168*c* and the tubular terminal portion 162*c*.

Furthermore, in Example 2, too, both members (the tubular current collector portion 168*c* and the tubular terminal portion 162*c*) are welded together, with the inner circumferential surface 162*h* of the tubular terminal portion 162*c* making tight contact with the outer circumferential surface 168*h* of the tubular current collector portion 168*c* owing to the resilient restoring force of the tubular terminal portion 162*c*. This further reduces electrical resistance between the tubular current collector portion 168*c* and the tubular terminal portion 162*c* in the battery 100 of Example 2.

To the plate-like terminal portion 162*b* of the external terminal 162 is welded a tubular safety vent 163 with a bottom such as to cover the tubular terminal portion 162*c* (see FIGS. 14 and 15). This safety vent 163 closes the cut-outs 162*d* of the tubular terminal portion 162*c* and hermetically seals the battery 1. This safety vent 163 is also formed such as to open by breaking open itself when internal pressure of the battery 100 (pressure inside the battery case 160) builds up and reaches a predetermined vent-opening pressure.

Next, the method of manufacturing the battery 100 of Example 2 will be described below.

First, as with Example 1, in a lamination step, the second electrode plate 20, separator 30, first electrode plate 10, and separator 30 are laminated one on another in this order (see FIG. 9). Next, the process goes to a winding step, where, as shown in FIG. 9, the laminated assembly 40A of the second electrode plate 20, first electrode plate 10, and separators 30 laminated one on another is wound around the cylindrical core 45. Thus the cylindrical wound electrode assembly 40 is formed (see FIG. 10).

After that, as with Example 1, the current collector member 72 is laser-welded to the end face 46*b* of the second wound portion 46. Further, in a joining step, the current collector 168 is laser-welded to the end face 44*b* of the first wound portion 44 (see FIG. 20).

Figure 20:
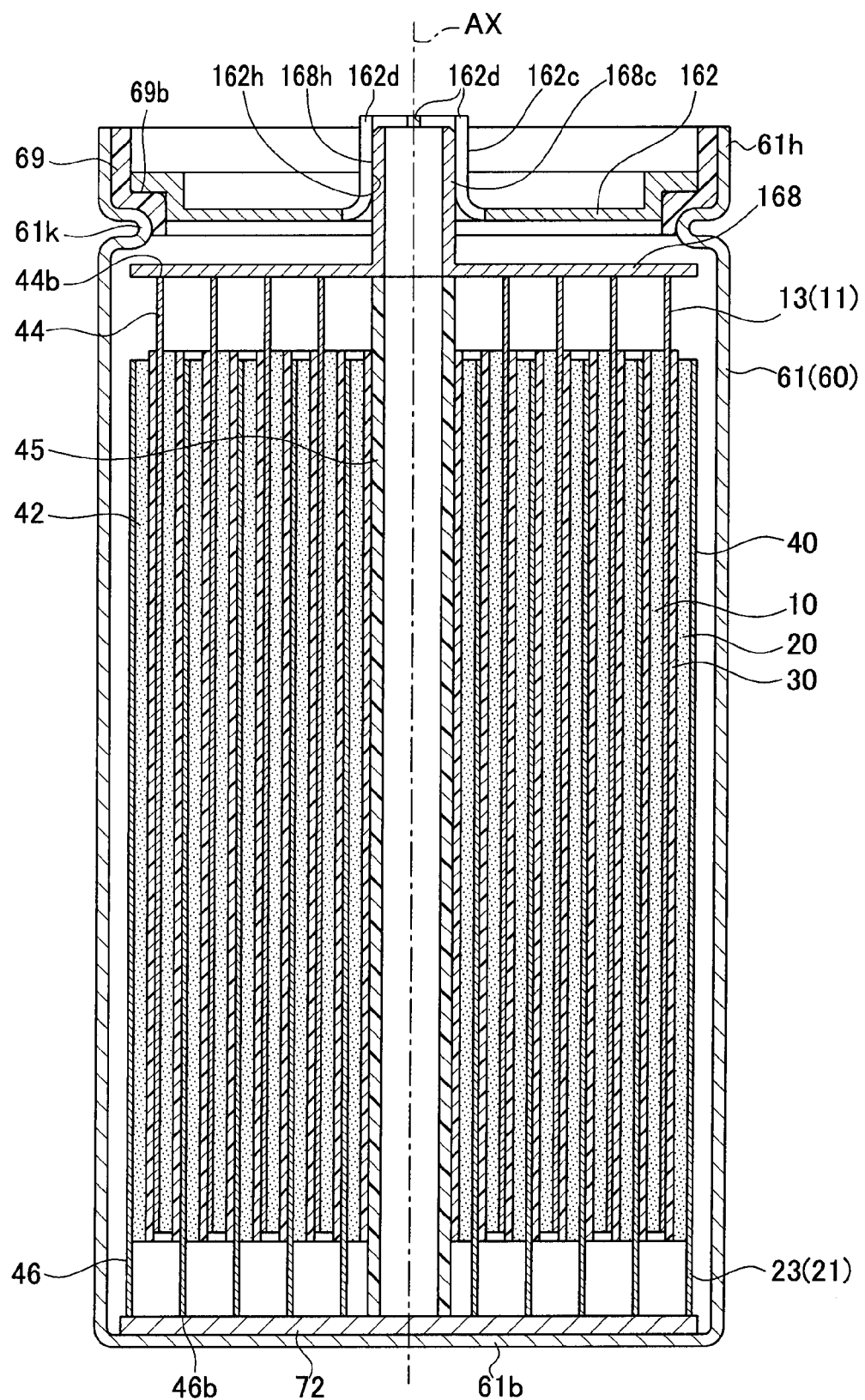
FIG. 20 is an explanatory view to show an insertion step of Example 2.

Next, the process goes to an encasing step, where, as with Example 1, the wound electrode assembly 40 to which the current collector 168 and the current collector member 72 have been welded is accommodated inside the case body 61 (see FIG. 20). After that, as with Example 1, the current collector member 72 is laser-welded to the bottom 61*b* of the case body 61.

Next, as with Example 1, part of the case body 61 at the distal end in the axis line direction (upper side in FIG. 20) of the case body 61 is deformed radially inwards (toward the axis line AX) all around the case body 61 to form the annular step or protrusion 61*k*. After that, as with Example 1, the annular gasket 69 is disposed inside the opening portion 61*h* of the case body 61.

Next, the process goes to an insertion step, where, as shown in FIG. 20, the tubular current collector portion 168*c* of the current collector 168 is inserted into the tubular terminal portion 162*c* of the external terminal 162. More specifically, with the tubular current collector portion 168*c* being inserted into the tubular terminal portion 162*c*, the external terminal 162 is disposed inside the opening portion 61*h* (more particularly, inside the gasket 69) of the case body 61. The position of the external terminal 162 relative to the case body 61 is determined by placing the external terminal onto the step or shoulder 69*b* of the gasket 69.

Note that the tubular terminal portion 162*c* of Example 2 has the cut-outs 162*d* formed by cutting off part of the wall 162*f* that forms the tubular terminal portion 162*c*. These cut-outs 162*d* are slit-like cut-outs extending from the distal end 162*g* of the tubular terminal portion 162*c* in the axis line direction (downward in FIG. 19). Thereby, the tubular terminal portion 162*c* can resiliently increase and decrease in diameter due to flexibility of the cut-outs 162*d*.

Furthermore, in Example 2, the tubular current collector portion 168*c* before being inserted into the tubular terminal portion 162*c* has the outside diameter R larger than the inside diameter S of the tubular terminal portion 162*c* (see FIGS. 16 to 19). In other words, the tubular terminal portion 162*c* has the inside diameter S smaller than the outside diameter R of the tubular current collector portion 168*c* before the tubular current collector portion 168*c* is inserted into the tubular terminal portion 162*c*. Namely, before the tubular current collector portion 168*c* is inserted into the tubular terminal portion 162*c*, the outside diameter R of the tubular current collector portion 168*c* is larger than the inside diameter S of the tubular terminal portion 162*c*.

Therefore, in the insertion step of Example 2, the tubular terminal portion 162*c* is resiliently increased in diameter as the cut-outs 162*d* in the tubular terminal portion 162*c* are pushed apart such that the outside diameter R of the tubular current collector portion 168*c* becomes equal to or smaller than the inside diameter S of the tubular terminal portion 162*c*, so that the tubular current collector portion 168*c* is inserted into the tubular terminal portion 162*c*. For this reason, after the insertion, the inner circumferential surface 162*h* of the tubular terminal portion 162*c* makes tight contact with the outer circumferential surface 168*h* of the tubular current collector portion 168*c* owing to the resilient restoring force (that acts to reduce the diameter to its initial state) of the tubular terminal portion 162*c*, so that the tubular current collector portion 168*c* is fastened inside the tubular terminal portion 162*c* (see FIG. 20). This electrically connects the tubular current collector portion 168*c* to the tubular terminal portion 162*c*.

With the manufacturing method of Example 2, in this way, the current collector 168 (tubular current collector portion 168*c*) and the external terminal 162 (tubular terminal portion 162*c*) can be fastened together in tight contact with each other without using a crimped member. This reduces electrical resistance (contact resistance) between the current collector 168 (tubular current collector portion 168*c*) and the external terminal 162 (tubular terminal portion 162*c*).

Next, the process goes to a welding step, where the tubular current collector portion 168*c* that has been inserted in the tubular terminal portion 162*c* is welded to the tubular terminal portion 162*c*. More specifically, the tubular terminal portion 162*c* is laser-welded to the tubular current collector portion 168*c* by irradiating a laser beam LB from outside the tubular terminal portion 162*c*. In Example 2, in particular, both members (the tubular current collector portion 168*c* and the tubular terminal portion 162*c*) can be welded together, with the inner circumferential surface 162*h* of the tubular terminal portion 162*c* making tight contact with the outer circumferential surface 168*h* of the tubular current collector portion 168*c* owing to the resilient restoring force of the tubular terminal portion 162*c*. This further reduces electrical resistance between the tubular current collector portion 168*c* and the tubular terminal portion 162*c*.

Next, as with Example 1, the opening portion 61*h* forming the opening 61*j* of the case body 61 is crimped to fasten the external terminal 162 together with the gasket 69 to the case body 61 (see FIGS. 14 and 15). After that, liquid electrolyte is poured into the case body 61 through the tube of the tubular current collector portion 168*c*. After that, the safety vent 163 is welded to the plate-like terminal portion 162*b* of the external terminal 162 such as to cover the tubular terminal portion 162*c*. Thereby the sealed battery 100 is complete.

EXAMPLE 3

Next, a battery 200 of Example 3 will be described. The battery 200 of Example 3 is different from the battery 1 of Example 1 in the configuration of the current collector (more particularly, tubular current collector portion), and is otherwise generally the same as Example 1. Therefore, the difference from Example 1 will be mainly described here and description of similar features will be omitted or simplified.

Figure 21:
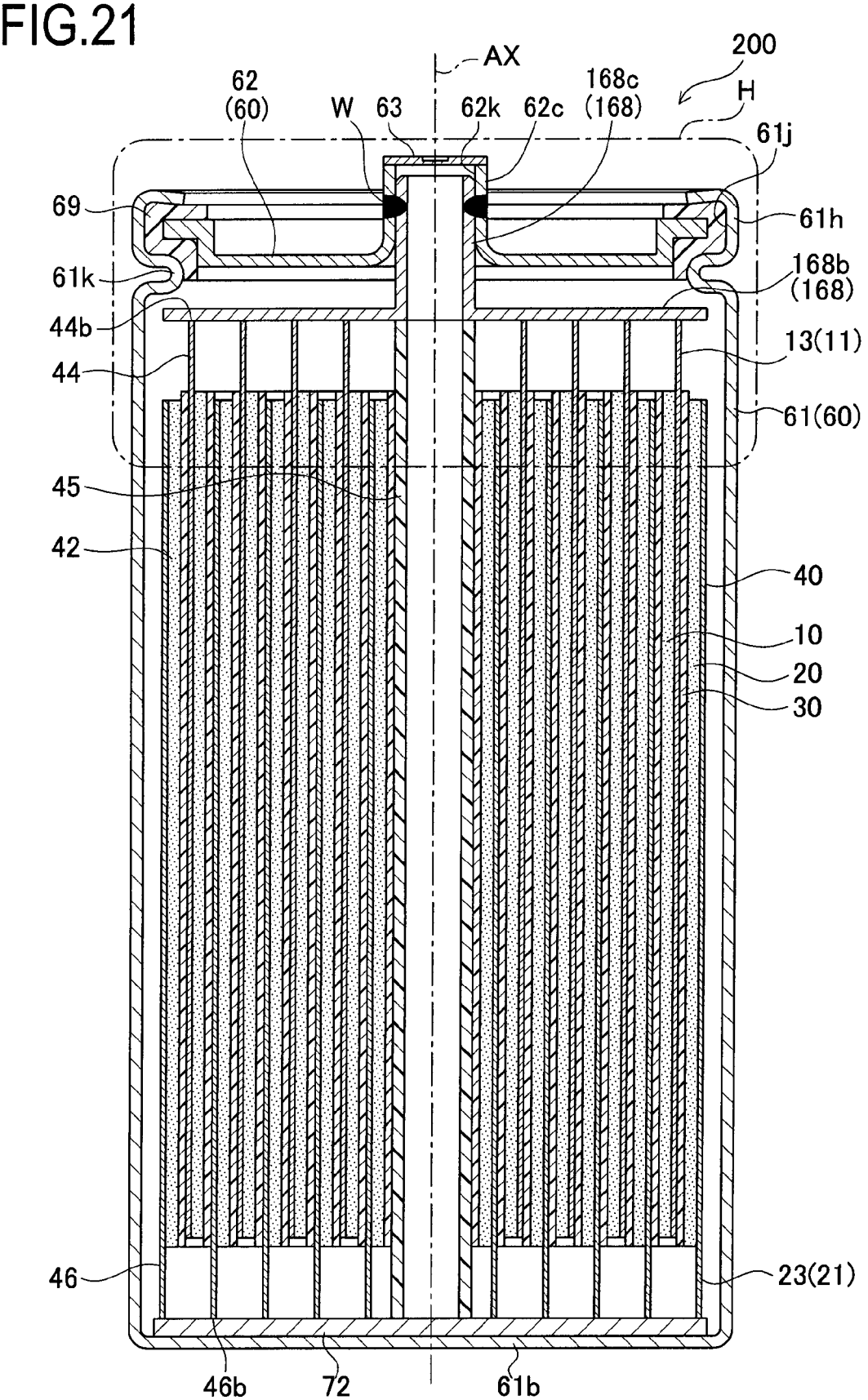
FIG. 21 is a longitudinal cross-sectional view of a battery of Example 3.

FIG. 21 is a longitudinal cross-sectional view (a cross-sectional view cut along the axis line AX) of the battery 200 of Example 3. The battery 200 of Example 3 uses the current collector 168 of Example 2 instead of the current collector 68 of Example 1, and an external terminal 62 equivalent to that of Example 1.

As mentioned above, the current collector 168 includes a plate-like current collector portion 168*b* and a tubular current collector portion 168*c* (see FIGS. 16 and 17). Unlike the current collector 68 of Example 1, the tubular current collector portion 168*c* of this current collector 168 is not formed with cut-outs. The external terminal 62 includes a plate-like terminal portion 62*b* and a tubular terminal portion 62*c* (see FIGS. 5 and 6). The tubular terminal portion 62*c* of this external terminal 62 is not formed with cut-outs, either.

Figure 22:
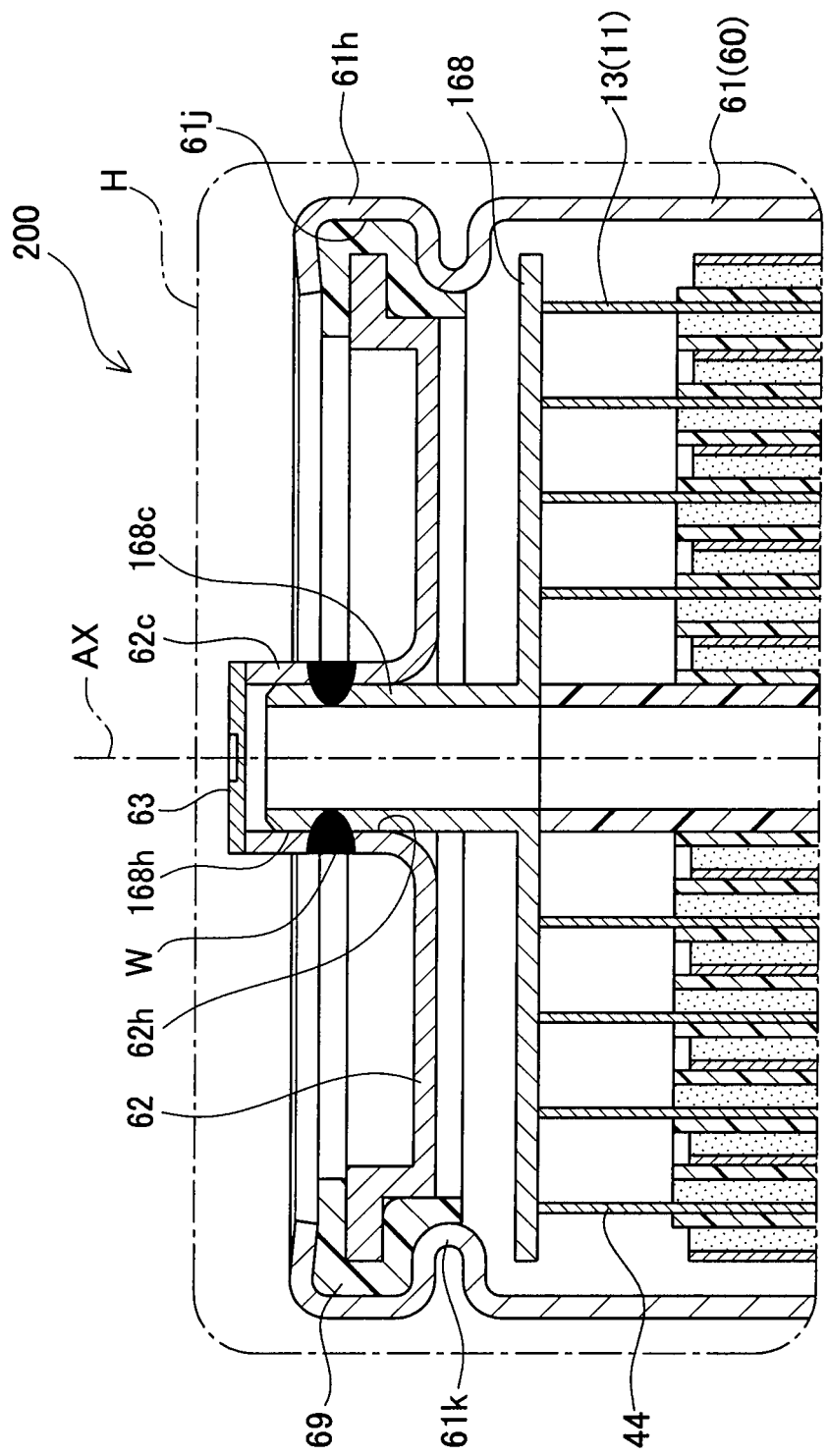
FIG. 22 is an enlarged view of a part H in FIG. 21.

In Example 3, too, the tubular current collector portion 168*c* of the current collector 168 is inserted into the tubular terminal portion 62*c* (see FIGS. 21 and 22). This electrically connects the external terminal 62 to the current collector 168 (tubular current collector portion 168*c*).

Note that in Example 3, the tubular current collector portion 168*c* before being inserted into the tubular terminal portion 62*c* has a larger outside diameter R than inside diameter S of the tubular terminal portion 62*c*. In other words, the tubular terminal portion 62*c* has the inside diameter S smaller than the outside diameter R of the tubular current collector portion 168*c* before the tubular current collector portion 168*c* is inserted into the tubular terminal portion 62*c*. Namely, before the tubular current collector portion 168*c* is inserted into the tubular terminal portion 62*c*, the outside diameter R of the tubular current collector portion 168*c* is larger than the inside diameter S of the tubular terminal portion 62*c*.

Figure 23:
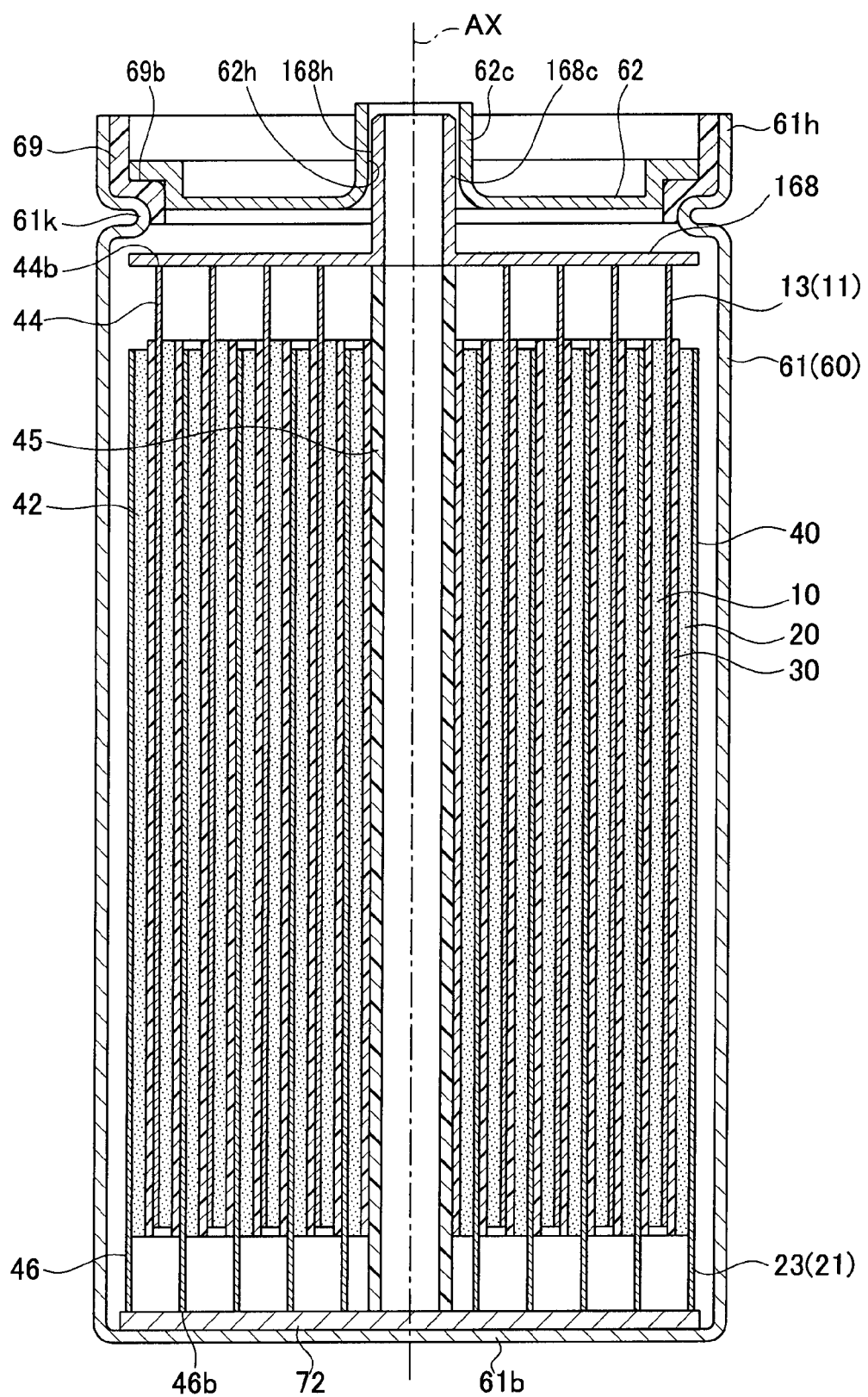
FIG. 23 is an explanatory view to show an insertion step of Example 3.

In this regard, in Example 3, when inserting the tubular current collector portion 168*c* into the tubular terminal portion 62*c*, the tubular terminal portion 62*c* is heated so that it increases in diameter by thermal expansion, and with the inside diameter S of the tubular terminal portion 62*c* being made larger than the outside diameter R of the tubular current collector portion 168*c*, the tubular current collector portion 168*c* is inserted into the tubular terminal portion 62*c* (see FIG. 23). Thus the tubular current collector portion 168*c* can be appropriately and smoothly inserted into the tubular terminal portion 62*c*.

Figure 24:
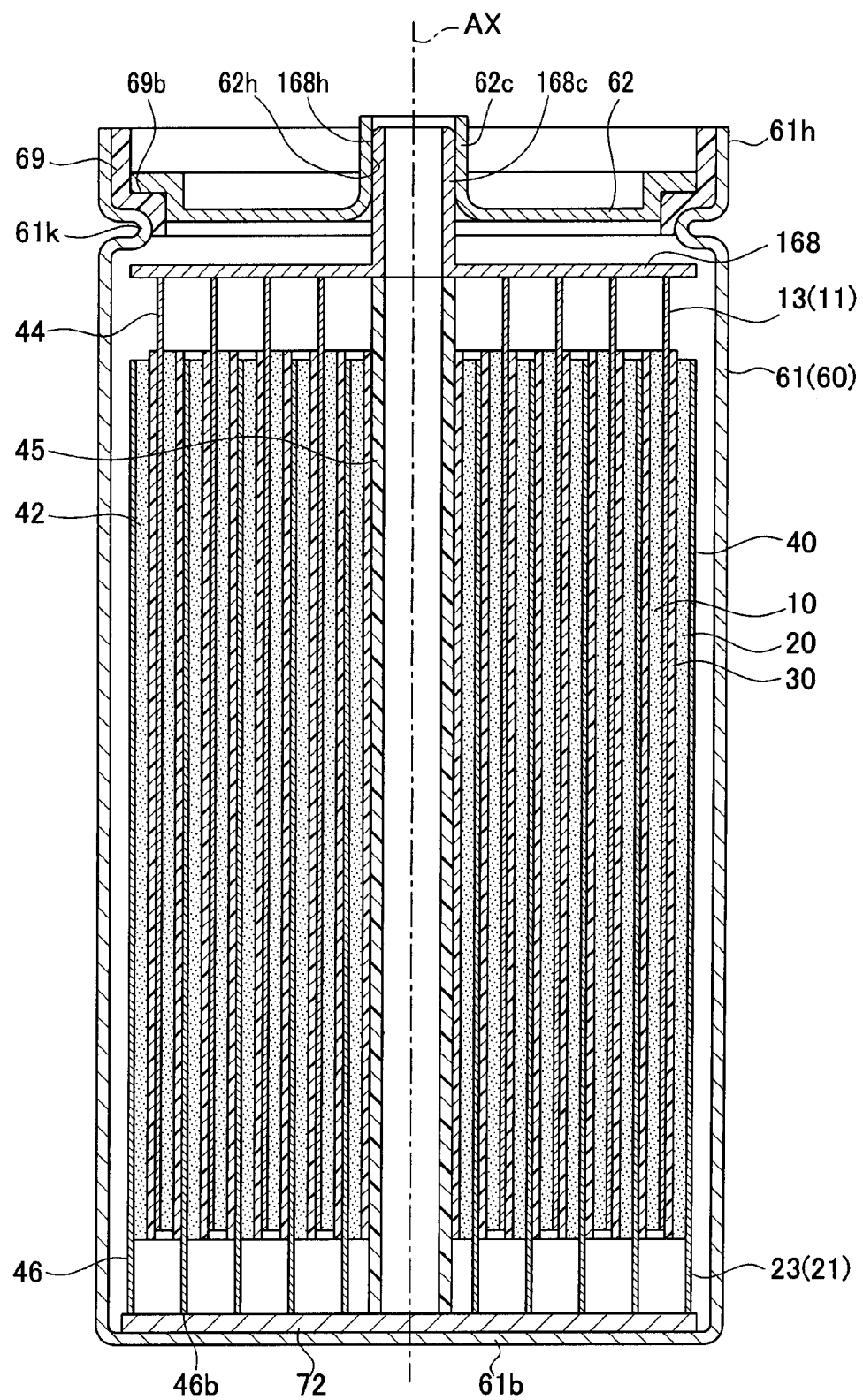
FIG. 24 is another explanatory view to show the insertion step of Example 3.

Furthermore, after the insertion, the inner circumferential surface 62*h* of the tubular terminal portion 62*c* makes tight contact with the outer circumferential surface 168*h* of the tubular current collector portion 168*c* owing to the restoring force (that acts to decrease the diameter to its initial state) of the tubular terminal portion 62*c* decreasing in diameter as the temperature of the tubular terminal portion 62*c* drops (to normal temperature), so that the tubular current collector portion 168*c* is fastened to the tubular terminal portion 62*c* (see FIG. 24). This reduces electrical resistance (contact resistance) between the tubular current collector portion 168*c* and the tubular terminal portion 62*c*.

Furthermore, in Example 3, both members (the tubular current collector portion 168*c* and the tubular terminal portion 62*c*) are welded together, with the inner circumferential surface 62*h* of the tubular terminal portion 62*c* making tight contact with the outer circumferential surface 168*h* of the tubular current collector portion 168*c* owing to the restoring force of the tubular terminal portion 62*c*. This further reduces electrical resistance between the tubular current collector portion 168*c* and the tubular terminal portion 62*c* in the battery 200 of Example 3, too.

Next, the method of manufacturing the battery 200 of Example 3 will be described below.

First, as with Example 1, in a lamination step, the second electrode plate 20, separator 30, first electrode plate 10, and separator 30 are laminated one on another in this order (see FIG. 9). Next, the process goes to a winding step, where, as shown in FIG. 9, the laminated assembly 40A of the second electrode plate 20, first electrode plate 10, and separators 30 laminated one on another is wound around the cylindrical core 45. Thus the cylindrical wound electrode assembly 40 is formed (see FIG. 10).

After that, as with Example 1, the current collector member 72 is laser-welded to the end face 46*b* of the second wound portion 46. Further, in a joining step, the current collector 168 is laser-welded to the end face 44*b* of the first wound portion 44 (see FIG. 23).

Next, the process goes to an encasing step, where, as with Example 1, the wound electrode assembly 40 to which the current collector 168 and the current collector member 72 have been welded is accommodated inside the case body 61 (see FIG. 23). After that, as with Example 1, the current collector member 72 is laser-welded to the bottom 61*b* of the case body 61.

Next, as with Example 1, part of the case body 61 at the distal end in the axis line direction (upper side in FIG. 23) is deformed radially inwards (toward the axis line AX) all around the case body 61 to form the annular step 61*k*. After that, as with Example 1, an annular gasket 69 is disposed inside the opening portion 61*h* of the case body 61.

Next, the process goes to an insertion step, where, as shown in FIG. 23, the tubular current collector portion 168*c* of the current collector 168 is inserted into the tubular terminal portion 62*c* of the external terminal 62. More specifically, with the tubular current collector portion 168*c* being inserted into the tubular terminal portion 62*c*, the external terminal 62 is disposed inside the opening portion 61*h* (more particularly, inside the gasket 69) of the case body 61. The position of the external terminal 62 relative to the case body 61 is determined by placing the external terminal onto the step 69*b* of the gasket 69.

Note that in Example 3, the tubular current collector portion 168*c* before being inserted into the tubular terminal portion 62*c* has a larger outside diameter R than an inside diameter S of the tubular terminal portion 62*c*. In other words, the tubular terminal portion 62*c* has the inside diameter S smaller than the outside diameter R of the tubular current collector portion 168*c* before the tubular current collector portion 168*c* is inserted into the tubular terminal portion 62*c*. Namely, before the tubular current collector portion 168c is inserted into the tubular terminal portion 62c, the outside diameter R of the tubular current collector portion 168c is larger than the inside diameter S of the tubular terminal portion 62c.

In this regard, in the insertion step of Example 3, the tubular terminal portion 62c is heated so that it increases in diameter by thermal expansion, and with the inside diameter S of the tubular terminal portion 62c being made larger than the outside diameter R of the tubular current collector portion 168c, the tubular current collector portion 168c is inserted into the tubular terminal portion 62c (see FIG. 23). Thus the tubular current collector portion 168c can be appropriately and smoothly inserted into the tubular terminal portion 62c.

Furthermore, after the insertion, the inner circumferential surface 62h of the tubular terminal portion 62c makes tight contact with the outer circumferential surface 168h of the tubular current collector portion 168c owing to the restoring force (that acts to decrease the diameter to its initial state) of the tubular terminal portion 62c decreasing in diameter as the temperature of the tubular terminal portion 62c drops (to normal temperature), so that the tubular current collector portion 168c is fastened to the tubular terminal portion 62c (see FIG. 24). This electrically connects the tubular current collector portion 168c to the tubular terminal portion 62c.

With the manufacturing method of Example 3, in this way, the current collector 168 (tubular current collector portion 168c) and the external terminal 62 (tubular terminal portion 62c) can be fastened together in tight contact with each other without using a crimped member. This reduces electrical resistance (contact resistance) between the current collector 168 (tubular current collector portion 168c) and the external terminal 62 (tubular terminal portion 62c).

Next, the process goes to a welding step, where the tubular current collector portion 168c that has been inserted in the tubular terminal portion 62c is welded to the tubular terminal portion 62c. More specifically, as with Example 1, the tubular terminal portion 62c is laser-welded to the tubular current collector portion 168c by irradiating a laser beam LB from outside the tubular terminal portion 62c. In Example 3, in particular, both members (the tubular current collector portion 168c and the tubular terminal portion 62c) can be welded together, with the inner circumferential surface 62h of the tubular terminal portion 62c making tight contact with the outer circumferential surface 168h of the tubular current collector portion 168c owing to the restoring force of the tubular terminal portion 62c. This further reduces electrical resistance between the tubular current collector portion 168c and the tubular terminal portion 62c.

Next, as with Example 1, the opening portion 61h forming the opening 61j of the case body 61 is crimped to fasten the external terminal 62 together with the gasket 69 to the case body 61 (see FIGS. 21 and 22). Next, liquid electrolyte is poured into the case body 61 through the tube of the tubular current collector portion 168c. After that, the safety vent 63 is welded all around to the distal end face of the tubular external terminal 62c. Thereby the sealed battery 200 is complete.

The present invention has been described in conjunction with Examples 1 to 3 above, but the present invention is not restricted to the examples above and may be changed suitably and applied without departing from the scope of the invention.

For example, in Examples 1 to 3, after the tubular current collector portion 68c or 168c is inserted into the tubular terminal portion 62c or 162c and they are fastened together in the insertion step, they (the tubular current collector portion 68c or 168c and the tubular terminal portion 62c or 162c) are welded together in the welding step. However, the battery may be manufactured without performing the welding step (without welding together the tubular current collector portion 68c or 168c and the tubular terminal portion 62c or 162c). Namely, electrical connection between both members (the tubular current collector portion 68c or 168c and the tubular terminal portion 62c or 162c) may be established by inserting the tubular current collector portion 68c or 168c into the tubular terminal portion 62c or 162c and fastening them together in the insertion step.

In Examples 1 to 3, as the current collector, a current collector is used, which includes the plate-like current collector portion 68b or 168b to which the end face 44b of the first wound portion 44 is joined, and the tubular current collector portion 68c or 168c protruding from this plate-like current collector portion 68b or 168b. However, the tubular current collector portion may be uniformly formed at the distal end of the core 45, for example, and this tubular current collector portion may be used as the current collector. Namely, with the first wound portion 44 being electrically connected to the tubular current collector portion of the core, this tubular current collector portion may be inserted into the tubular terminal portion of the external terminal.

DESCRIPTION OF THE REFERENCE SIGNS 1, 100, 200 Battery
10 First electrode plate
20 Second electrode plate
30 Separator
40 Wound electrode assembly (Electrode assembly)
45 Core
62, 162 External terminal
62c, 162c Tubular terminal portion
162d Cut-out
68, 168 Current collector
68c, 168c Tubular current collector portion
68d Cut-out
61 Case body
63, 163 Safety vent
R Outside diameter of tubular current collector portion
S Inside diameter of tubular terminal portion

The invention claimed is:

1. A method of manufacturing a battery including:
an electrode assembly having a first electrode plate, a second electrode plate, and a separator;
a current collector electrically connected to the first electrode plate or the second electrode plate and including a tubular current collector portion; and
an external terminal electrically connected to the current collector and including a tubular terminal portion in which the tubular current collector portion is inserted,
wherein the tubular current collector portion has an outside diameter larger than an inside diameter of the tubular terminal portion before the tubular current collector portion is inserted into the tubular terminal portion,
the method includes an insertion step of inserting the tubular current collector portion into the tubular terminal portion by reducing the diameter of the tubular current collector portion or increasing the diameter of the tubular terminal portion so that the outside diameter of the tubular current collector portion becomes equal to or smaller than the inside diameter of the tubular terminal portion, after which an outer circumferential surface of the tubular current collector portion and an inner circumferential surface of the tubular terminal portion are brought into tight contact with each other by a restoring force of the tubular current collector portion with the reduced diameter or the tubular terminal portion with the increased diameter so as to fasten the tubular current collector portion to the tubular terminal portion, the tubular current collector portion includes a cut-out formed by cutting off part of a wall forming the tubular current collector portion, the cut-out extending from a distal end of the tubular current collector portion along an axis line direction, and the insertion step includes inserting the tubular current collector portion into the tubular terminal portion by resiliently reducing the diameter of the tubular current collector portion so as to compress the cut-out in the tubular current collector portion, after which the outer circumferential surface of the tubular current collector portion is brought into tight contact with the inner circumferential surface of the tubular terminal portion by a resilient restoring force of the tubular current collector portion, so that the tubular current collector portion is fastened to the tubular terminal portion.

2. A method of manufacturing a battery including:

an electrode assembly having a first electrode plate, a second electrode plate, and a separator;

a current collector electrically connected to the first electrode plate or the second electrode plate and including a tubular current collector portion; and an external terminal electrically connected to the current collector and including a tubular terminal portion in which the tubular current collector portion is inserted, wherein the tubular current collector portion has an outside diameter larger than an inside diameter of the tubular terminal portion before the tubular current collector portion is inserted into the tubular terminal portion, the method includes an insertion step of inserting the tubular current collector portion into the tubular terminal portion by reducing the diameter of the tubular current collector portion or increasing the diameter of the tubular terminal portion so that the outside diameter of the tubular current collector portion becomes equal to or smaller than the inside diameter of the tubular terminal portion, after which an outer circumferential surface of the tubular current collector portion and an inner circumferential surface of the tubular terminal portion are brought into tight contact with each other by a restoring force of the tubular current collector portion with the reduced diameter or the tubular terminal portion with the increased diameter so as to fasten the tubular current collector portion to the tubular terminal portion, the tubular terminal portion includes a cut-out formed by cutting off part of a wall forming the tubular terminal portion, the cut-out extending from a distal end of the tubular terminal portion along an axis line direction, and the insertion step includes inserting the tubular current collector portion into the tubular terminal portion by resiliently increasing the diameter of the tubular terminal portion such that the cut-out in the tubular terminal portion is pushed apart, after which the inner circumferential surface of the tubular terminal portion is brought into tight contact with the outer circumferential surface of the tubular current collector portion by a resilient restoring force of the tubular terminal portion, so that the tubular current collector portion is fastened to the tubular terminal portion.

3. A method of manufacturing a battery including:

an electrode assembly having a first electrode plate, a second electrode plate, and a separator;

a current collector electrically connected to the first electrode plate or the second electrode plate and including a tubular current collector portion; and an external terminal electrically connected to the current collector and including a tubular terminal portion in which the tubular current collector portion is inserted, wherein the tubular current collector portion has an outside diameter larger than an inside diameter of the tubular terminal portion before the tubular current collector portion is inserted into the tubular terminal portion, the method includes an insertion step of inserting the tubular current collector portion into the tubular terminal portion by reducing the diameter of the tubular current collector portion or increasing the diameter of the tubular terminal portion so that the outside diameter of the tubular current collector portion becomes smaller than the inside diameter of the tubular terminal portion, after which an outer circumferential surface of the tubular current collector portion and an inner circumferential surface of the tubular terminal portion are brought into tight contact with each other by a restoring force of the tubular current collector portion with the reduced diameter or the tubular terminal portion with the increased diameter so as to fasten the tubular current collector portion to the tubular terminal portion, and the insertion step includes heating the tubular terminal portion to increase the diameter of the tubular terminal portion by thermal expansion and inserting the tubular current collector portion into the tubular terminal portion with the inside diameter of the tubular terminal portion being made larger than the outside diameter of the tubular current collector portion, after which the inner circumferential surface of the tubular terminal portion is brought into tight contact with the outer circumferential surface of the tubular current collector portion by the restoring force of the tubular terminal portion reducing its diameter as a temperature of the tubular terminal portion drops, so that the tubular current collector portion is fastened to the tubular terminal portion.

4. The method of manufacturing a battery according to claim 1, further including, after the insertion step, a welding step of welding the tubular current collector portion and the tubular terminal portion together while the tubular current collector portion is fastened to the tubular terminal portion with the inner circumferential surface of the tubular terminal portion and the outer circumferential surface of the tubular current collector portion being placed in tight contact with each other.

5. The method of manufacturing a battery according to claim 2, further including, after the insertion step, a welding step of welding the tubular current collector portion and the tubular terminal portion together while the tubular current collector portion is fastened to the tubular terminal portion with the inner circumferential surface of the tubular terminal portion and the outer circumferential surface of the tubular current collector portion being placed in tight contact with each other.

6. The method of manufacturing a battery according to claim 3, further including, after the insertion step, a welding step of welding the tubular current collector portion and the tubular terminal portion together while the tubular current collector portion is fastened to the tubular terminal portion with the inner circumferential surface of the tubular terminal portion and the outer circumferential surface of the tubular current collector portion being placed in tight contact with each other.

* * * * *